(12) United States Patent
Ohsawa et al.

(10) Patent No.: US 6,222,509 B1
(45) Date of Patent: Apr. 24, 2001

(54) IMAGE DISPLAY APPARATUS

(75) Inventors: Toshifumi Ohsawa, Tokyo; Akihiko Nagano, Ichihara, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/085,296

(22) Filed: May 27, 1998

(30) Foreign Application Priority Data

| May 30, 1997 | (JP) | 9-142140 |
| May 30, 1997 | (JP) | 9-142141 |
| Jun. 11, 1997 | (JP) | 9-153724 |

(51) Int. Cl.⁷ ............... G09G 3/00; G09G 3/36; G02F 1/1335
(52) U.S. Cl. .................. 345/32; 345/87; 349/5; 349/68
(58) Field of Search .................. 345/102, 207, 345/32, 87; 359/559–561, 10, 16; 382/210; 348/203, 335, 764, 771; 349/5, 61, 68, 70

(56) References Cited

U.S. PATENT DOCUMENTS

| 4,060,316 | * | 11/1977 | Pollack et al. | 353/20 |
| 4,080,058 | | 3/1978 | Stephany et al. | 355/14 |
| 4,908,876 | * | 3/1990 | DeForest et al. | 382/54 |
| 5,030,985 | * | 7/1991 | Bryant | 396/234 |
| 5,111,515 | * | 5/1992 | Javidi | 382/254 |
| 5,159,474 | * | 10/1992 | Franke et al. | 359/29 |
| 5,212,555 | * | 5/1993 | Stoltz | 348/203 |
| 5,264,951 | * | 11/1993 | Takanashi et al. | 359/53 |
| 5,299,042 | * | 3/1994 | Takanashi et al. | 359/72 |
| 5,528,392 | | 6/1996 | Nakagawa et al. | 359/41 |
| 5,546,128 | * | 8/1996 | Nakagakiuchi et al. | 348/362 |
| 5,555,128 | * | 9/1996 | Khoury et al. | 359/559 |
| 5,612,798 | * | 3/1997 | Tuli | 349/24 |
| 5,856,814 | * | 1/1999 | Yagyu | 345/89 |
| 6,040,880 | * | 3/2000 | Tsuboi et al. | 349/5 |

FOREIGN PATENT DOCUMENTS

| 0433944 | 6/1991 | (EP) | H04N/1/40 |
| 0512842 | 11/1992 | (EP) | G02F/1/135 |
| 0583114 | 2/1994 | (EP) | G02F/1/135 |

* cited by examiner

Primary Examiner—Vijay Shankar
Assistant Examiner—Jeff Piziali
(74) Attorney, Agent, or Firm—Robin Blecker & Daley

(57) ABSTRACT

An image display apparatus having a storage/display element for receiving writing light indicative of an image obtained from an original, storing the image and displaying the stored image, includes a light detecting mechanism for detecting light which has an influence on writing, and a determining circuit for determining an image storage operation condition for the storage/display element according to an amount of light detected by the light detecting mechanism.

42 Claims, 22 Drawing Sheets

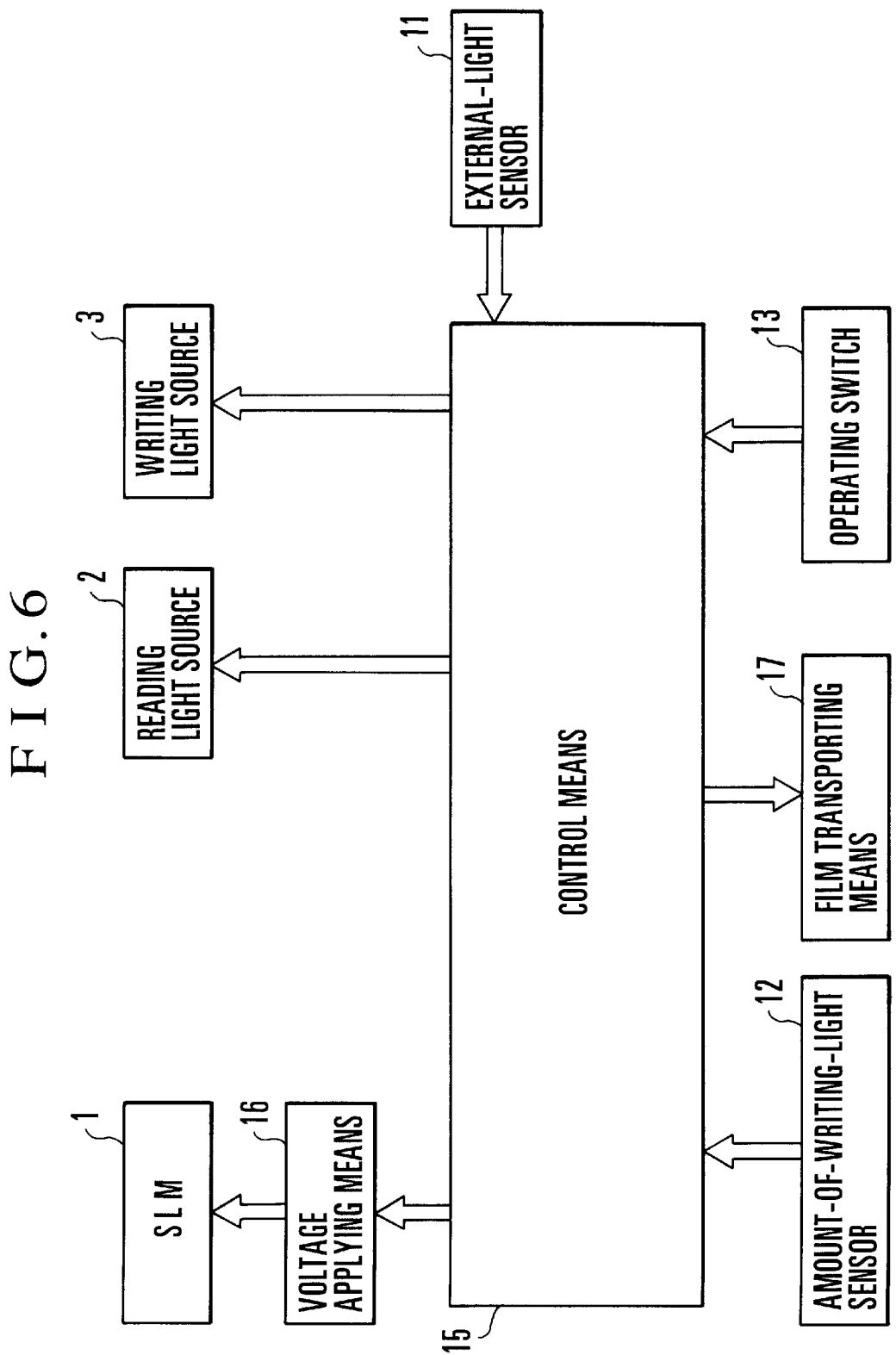
F I G. 6

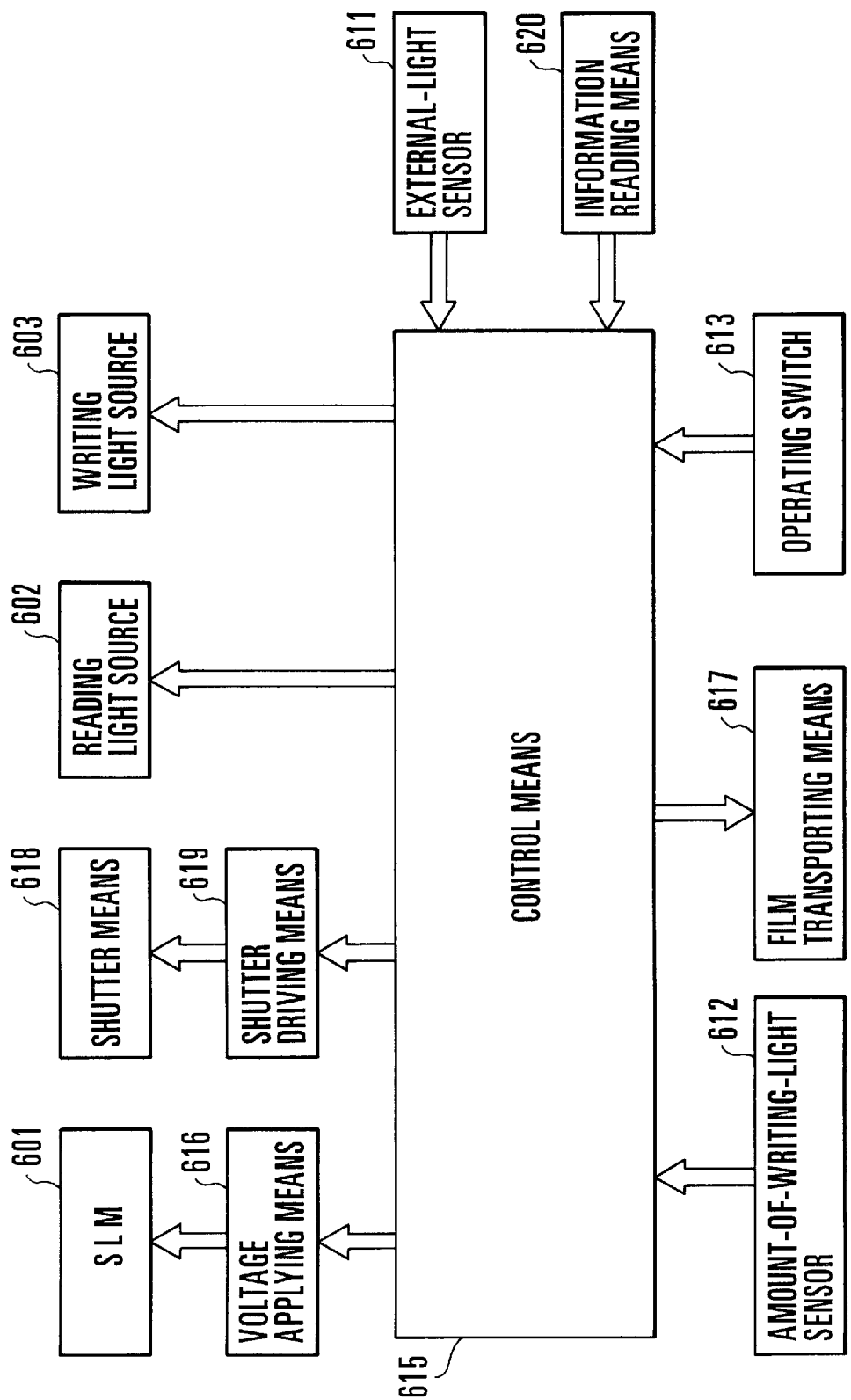

IMAGE DISPLAY APPARATUS

BACKGROUND OF THE INVENTION

1. Field of the Invention

The present invention relates to an image display apparatus using storage display means.

2. Description of Related Art

It has been proposed to provide an image display apparatus arranged to write a negative image or a positive image recorded on a photographic film or the like to a spatial light modulator (SLM) and read the recorded negative or positive image from the spatial light modulator so that a user can view the recorded negative or positive image. It has also been proposed to provide an apparatus arranged to write an image recorded on a negative film to a spatial light modulator by projection by means of a writing light source so that a use can view the written image as a positive image.

In such an apparatus, if an image recorded on a negative film or the like is to be written to the spatial light modulator, it is desirable to adjust the density of writing light in conformity with the range of reproduction of the tone of an image to be read from the spatial light modulator.

However, the density of an image to be written, recorded on a film or the like, depends on the color or the brightness of a photographed subject, a variation in the accuracy of exposure during photography or the conditions of illumination of the subject (front light or back light), and even if writing of the image to the spatial light modulator is performed under fixed conditions, it is considerably difficult to conform the tone of the image written to the spatial light modulator with the range of reproduction of the tone of an image read from the spatial light modulator, and external light during writing has an influence on the reproduction of tone of the spatial light modulator during reading. If an image is written to the spatial light modulator so as not to conform with the range of reproduction of the tone of an image to be read from the spatial light modulator, a read image will lose gradation in its bright or dark portion or the original color of the image will not be reproduced, so that a user will be forced to view an image which is visually extremely impaired.

A photographic system using a photographic film on which a magnetic recording portion is provided has been proposed. In the photographic system, data is recorded on the magnetic recording portion during photography with a camera, and the data is reproduced and used in a later development or printing process. For example, Japanese Laid-Open Patent Application No. Hei 6-18978 proposes the art of recording information such as the date or time of photography and the exposure of photography on the magnetic recording portion, and Japanese Laid-Open Patent Application No. Hei 1-280732 proposes the art of recording information relative to the color temperature of a subject on the magnetic recording portion during photography, and using the recorded information as color tone correction data in a printing process.

BRIEF SUMMARY OF THE INVENTION

One object of the present invention is to improve the reproducibility of tone of a storage display apparatus by causing the storage display apparatus to perform an image storage operation so that the amount of writing light reaches a predetermined amount of light, the storage display apparatus being arranged to receive writing light from an image original and displayably store an image.

Other objects of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 6 is a block diagram of the electrical circuit of the image display apparatus according to the first embodiment of the present invention;

FIG. 18 is a block diagram of the electrical circuit of the image display apparatus according to the eighth embodiment of the present invention;

DETAILED DESCRIPTION OF THE INVENTION

Figure 1:
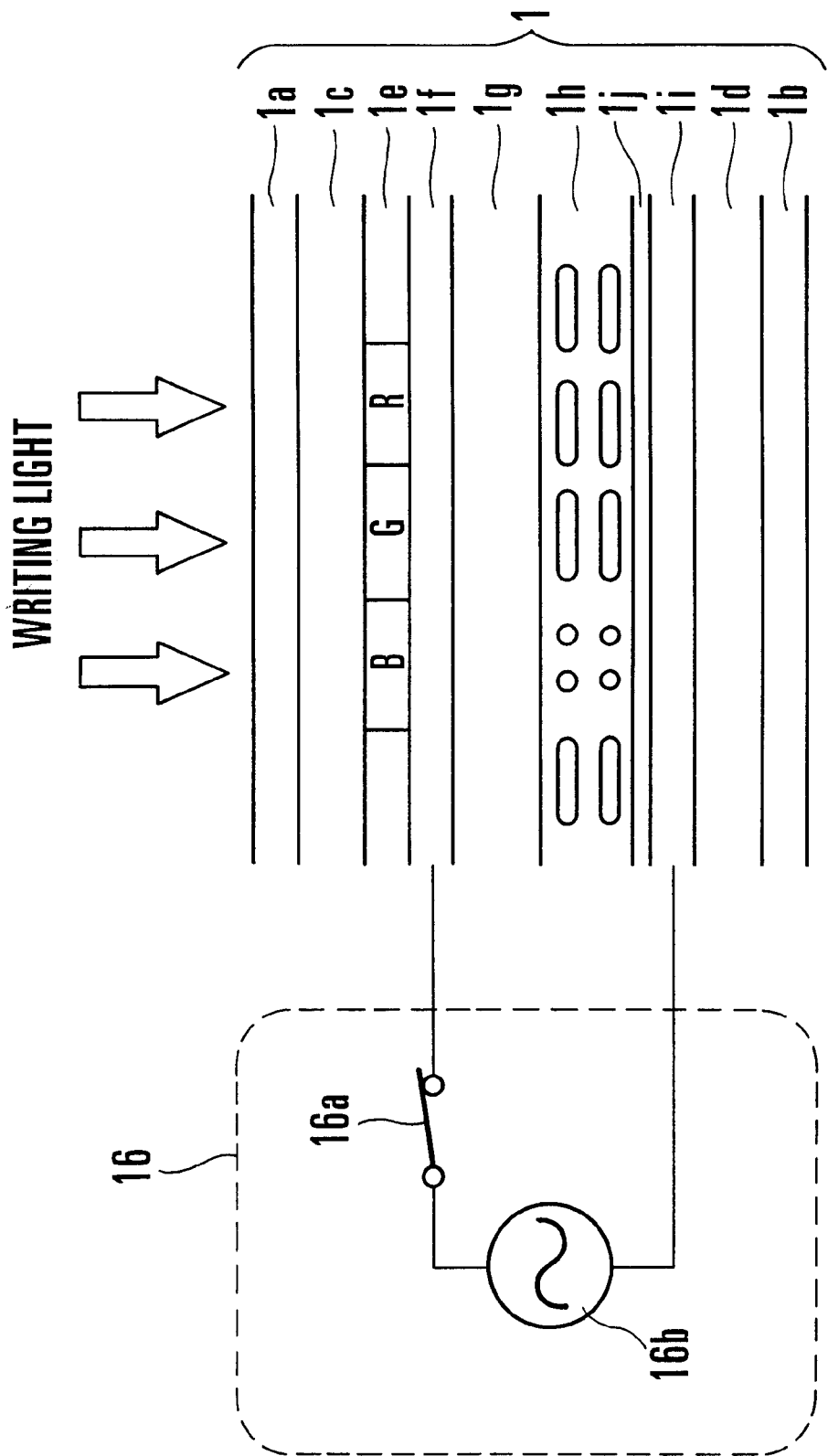
FIG. 1 is a diagrammatic cross-sectional view aiding in describing the construction and the operation principle of a spatial light modulator (SLM) used in an image display apparatus according to each embodiment of the present invention.

Preferred embodiments of the present invention will be described below in detail with reference to the accompanying drawings.

(First Embodiment)

First of all, the construction and the operation principle of a spatial light modulator (hereinafter referred to as the SLM) which allows an image to be written thereto (storage) and to be read therefrom (display) and is used in each of the preferred embodiments of the present invention will be described below with reference to FIGS. 1 and 2. An SLM 1 includes a polarizer 1a, a glass 1c, a color filter 1e of pure colors or complementary colors, an ITO (indium tin oxide) layer 1f which constitutes a transparent electrode, a photoconductor layer 1g made from an amorphous film, an organic semiconductor film or the like, a liquid crystal layer 1h made of a ferroelectric liquid crystal (FLC) or the like, an alignment film 1j, an ITO layer 1f which constitutes another transparent electrode, a glass 1d, and a polarizer 1b. These layers 1a, 1c, 1e, 1f, 1g, 1h, 1j, 1f, 1d and 1b are stacked one on another in such a manner that the layers 1e, 1f, 1g, 1h, 1j and 1f are sandwiched between the layers 1a and 1c and the layers 1d and 1b.

The polarizers 1a and 1b are of a cross Nicol type in which their polarization directions are perpendicular to each other. The liquid crystal layer 1h is sufficiently reduced in layer thickness, and the longitudinal axes of its liquid crystal molecules are oriented to be tilted by a predetermined angle with respect to its layer surfaces by the action of the alignment film 1j. This angle is varied by the application of an electric field, and is held even after the application of the electric field is stopped.

The SLM 1 may be of another type in which its polarizers have arbitrarily selected polarization directions and its liquid crystal molecules have an arbitrarily selected orientation angle. For example, the SLM 1 may also be of a type which is non-transmissive before an application of an electric field but becomes transmissive after the application of an electric field, or of a type which is transmissive before an application of an electric field but becomes non-transmissive after the application of an electric field. The former type is suited to the case in which a user views a so-called positive image on an as-is basis, i.e., as a positive image, whereas the latter type is suited to the case in which a user views a so-called negative image as a reversed positive image.

Voltage applying means 16 includes a switch 16a and a power source 16b.

AS shown in FIG. 1, when writing light having image information enters the SLM 1 and the switch 16a is turned on to apply a predetermined voltage across both transparent electrodes 1f and 1i, writing of an image is carried out. When the writing light having the image information enters the SLM 1, the writing light is transmitted through the polarizer 1a and the glass 1c and enters the color filter 1e. After color separation in the color filter 1e, the writing light is transmitted through the transparent layer 1f and enters the photoconductor layer 1g. In the photoconductor layer 1g, its electrical resistance becomes relatively lower in a portion exposed to a larger light intensity, so that, in the liquid crystal layer 1h (made of a ferroelectric liquid crystal (FLC)), a relatively larger electric field is applied to a portion exposed to a larger light intensity and the orientation angle of the liquid crystal molecules is varied. Accordingly, the orientation angle of the liquid crystal molecules of the ferroelectric liquid crystal (FLC) is determined in accordance with the image information, i.e., the color information and the light intensity of the writing light, whereby the image is written to the SLM 1.

Then, when the entering of the writing light and the application of the voltage across both transparent electrodes 1f and 1i are stopped, the writing operation is completed. Incidentally, a feature of the ferroelectric liquid crystal (FLC) is that even if the switch 16a is turned off and the application of the voltage is stopped, the orientation angle of the liquid crystal molecules is memorized.

Figure 2:
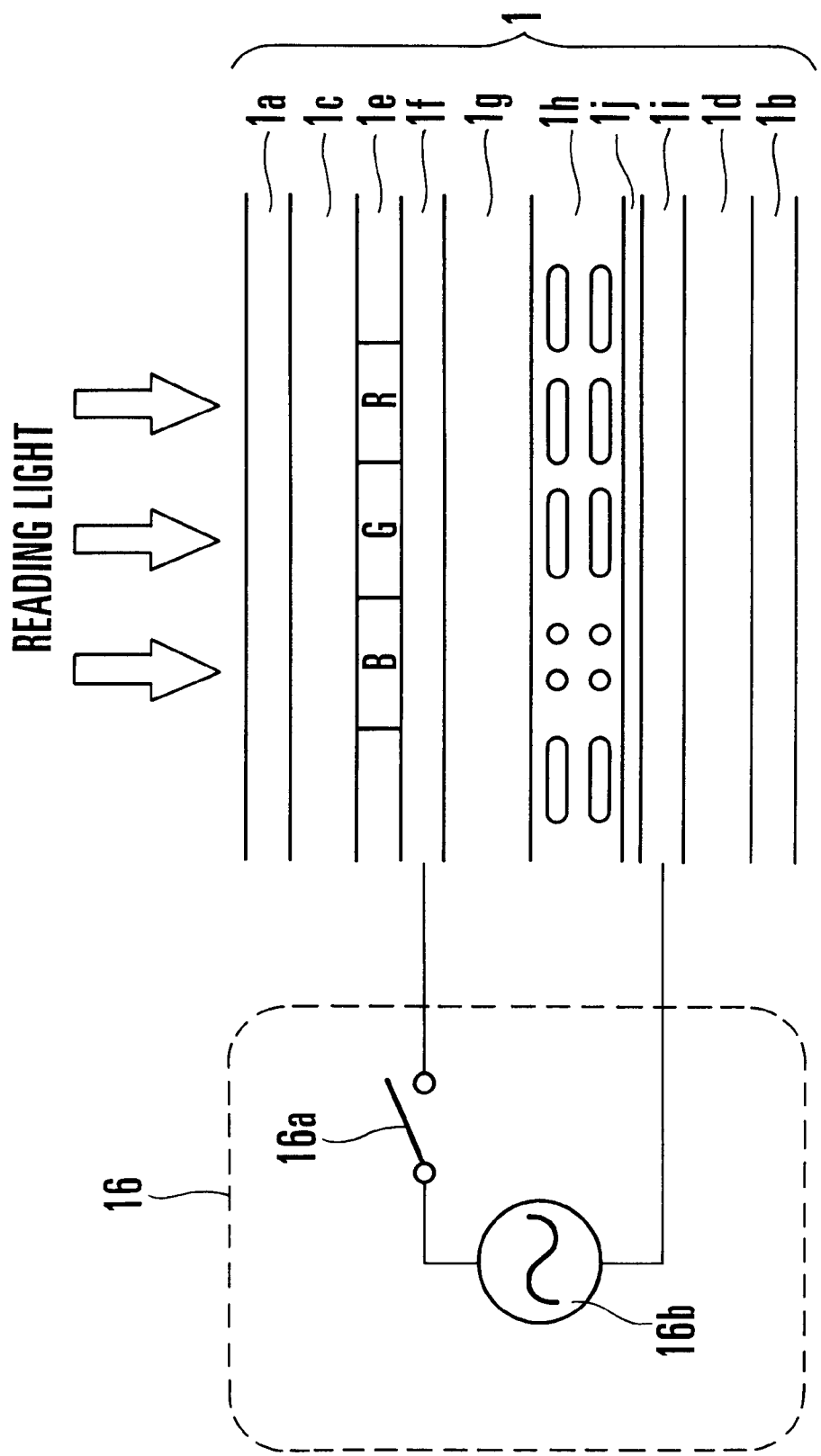
FIG. 2 is a diagrammatic cross-sectional view aiding in describing the construction and the operation principle of the spatial light modulator (SLM)

Then, during this state, if uniform light is projected on the SLM 1 as reading light in the same direction as the writing light as shown in FIG. 2, a user can view the written image on the opposite side to a light projection surface.

Incidentally, if the written image is to be erased, the reverse voltage to the voltage applied during the writing is applied across both transparent electrodes 1f and 1i with no light being projected on the SLM 1.

Figure 3:
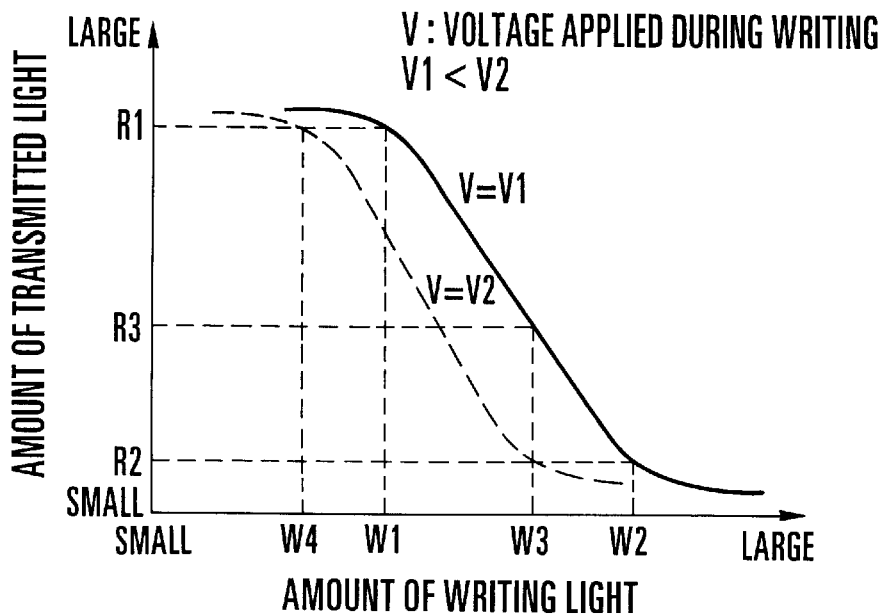
FIG. 3 is a graph aiding in describing the relation between the amount of writing light and the amount of transmitted light in the spatial light modulator (SLM)

FIG. 3 shows the relation between the density of a written image (i.e., a variation in the amount of writing light) and the density of a read image (i.e., a variation in the amount of transmitted light) in the SLM 1 of the type which allows a user to view a negative image as a reversed positive image. Letting V1 be the value of a voltage to be applied to the SLM 1 by the voltage applying means 16 during writing, a variation in the amount of light transmitted through the SLM 1 with respect to a variation in the amount of writing light during the projection of predetermined reading light is as shown by a solid line. Since the SLM 1 is of the type which reverses a negative image to a positive image, the amount of transmitted light becomes smaller as the amount of writing light becomes larger. The maximum and minimum values of the amount of transmitted light are determined according to a particular saturation level determined as the device performance of the SLM 1, and the range from the amount of transmitted light "R1" to the amount of transmitted light "R2", which does not reach the saturation level, can be regarded as the range of tone reproduction of the SLM 1.

In this case, if writing light has an image the density of which ranges from W1 to W2, the image can be written in conformity with the range of tone reproduction of the SLM 1. However, if writing light has a range smaller than W1, the range constitutes the brightest portion of a read image that is equivalent to the amount of transmitted light "R1", and hence gradation is lost. Contrarily, if writing light has a range larger than W2, the range constitutes the darkest portion of a read image that is equivalent to the amount of transmitted light "R2", and hence gradation is lost.

Assuming that writing light has an image the density of which ranges from W3 to W4, if the density of a read image is obtained in accordance with the aforesaid solid line for V1 which is the value of a voltage to be applied to the SLM 1 during writing, the amount of transmitted light in the darkest portion of the read image is R3 and the density of the image in the range of from the amount of writing light "W1" to the amount of writing light "W2" is approximately saturated at the amount of reading light "R1". Accordingly, the density of the entire read image is biased to a brighter side, and the original gradation of the written image is not reproduced.

However, if the value of the voltage to be applied to the SLM 1 during writing is set to V2 which is slightly higher than V1, the applied voltage becomes higher and the orientation angle of the liquid crystal molecules is more easily varied with a smaller amount of writing light. Accordingly, the density of a written image in the range of W3 to W4 can be accommodated in the density of a read image in the range of R1 to R2. Although it is, of course, not preferable to extremely vary the applied voltage during writing, for example, because the range of tone reproduction of the SLM 1 itself is narrowed to a great extent, it is possible to control the density of the read image by varying the applied voltage during writing within a particular range according to the density of the written image.

Figure 4:
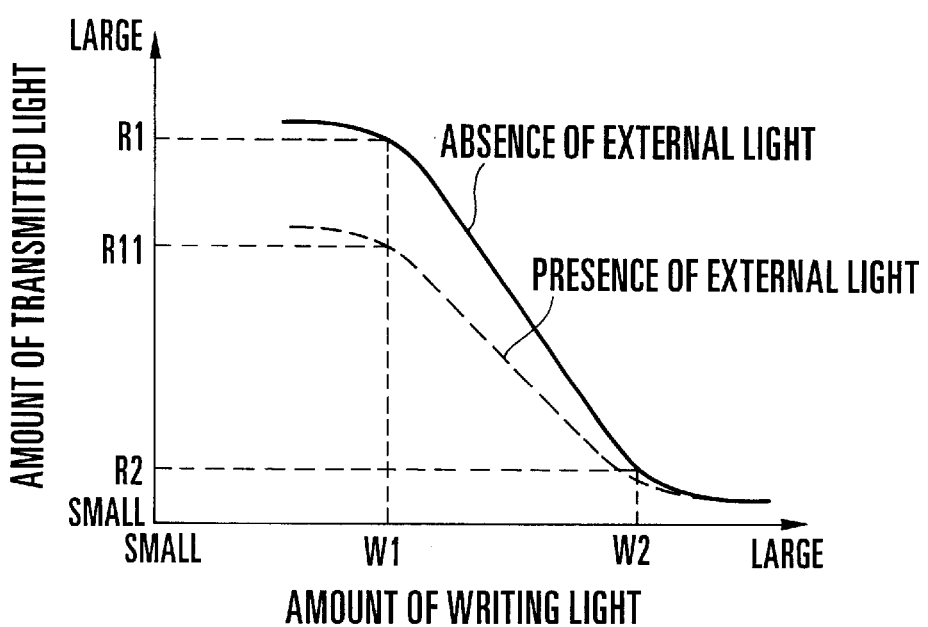
FIG. 4 is a graph aiding in describing the relation between the amount of writing light and the amount of transmitted light in the spatial light modulator (SLM)

If the SLM 1 is illuminated with external light (background light) in addition to writing light during the writing of an image to the SLM 1, a writing to the SLM 1 due to an external light component will undesirably occur. FIG. 4 shows a variation due to external light between the density of a written image (i.e., a variation in the amount of writing light) and the density of a read image (i.e., a variation in the amount of transmitted light) in the SLM 1 of the type which allows a user to view a negative image as a reversed positive image.

In FIG. 4, a solid line indicates the relation between the amount of writing light and the amount of transmitted light when an image is written by the application of a predetermined voltage during writing by the voltage applying means 16 under the condition that external light can be regarded as being absent. As in the case shown by the solid line of FIG. 3, the range of from the amount of writing light "W1" to the amount of writing light "W2" can be reproduced in the range of from the amount of transmitted light "R1" to the amount of transmitted light "R2". If the SLM 1 is illuminated with a predetermined level of external light while writing is being performed under such a situation, the applied voltage during writing exhibits the relation shown by a dashed line in FIG. 3, so that the amount of transmitted light in the brightest portion of a read image becomes lower to R11 according to the level of the external light and gradation is compressed to produce a wholly dark image.

If a preferable read image is to be obtained even when external light is present during writing, a writing voltage to be applied to the SLM 1 during writing is controlled to become lower than when external light is absent, thereby preventing the orientation angle of the liquid crystal molecules from being easily varied. Thus, it is possible to correct the entire image in such a manner that its brightness increases within a particular range. Further, the amount of writing light is controlled to become larger than when external light is absent, whereby the influence of external light is relatively suppressed and it is possible to correct the entire image in such a manner that the gradation compression of its bright portion decreases within a particular range.

Figure 5B:
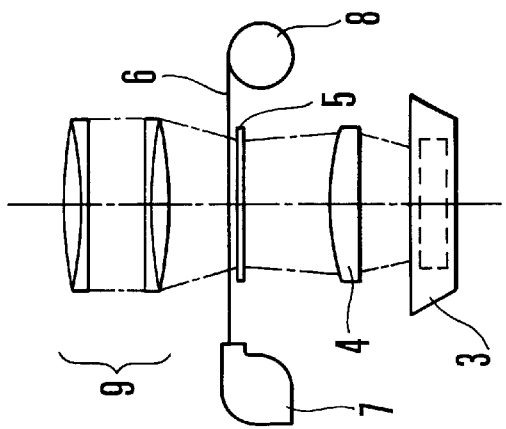
FIGS. 5(a) and 5(b) are diagrammatic layout views respectively showing the whole and a part of an image display apparatus according to a first embodiment of the present invention.
Figure 5A:
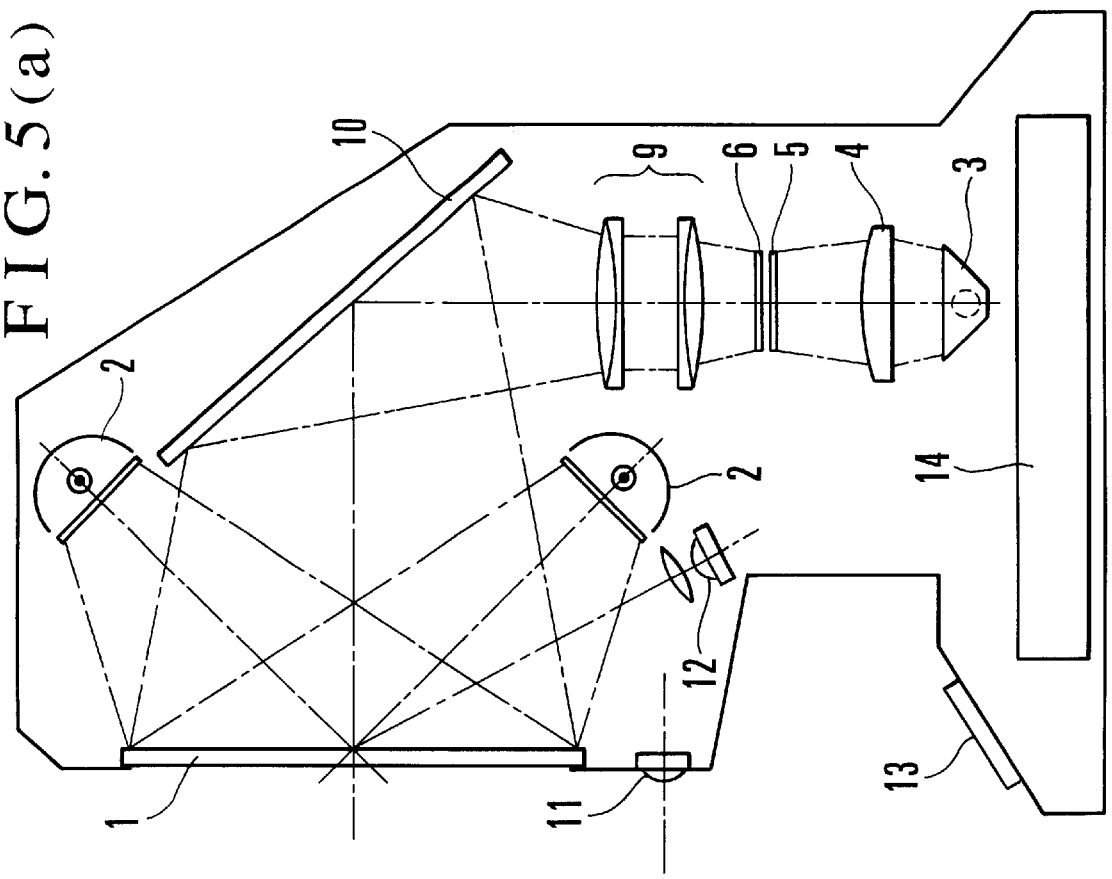

FIG. 5(*a*) shows the layout of the entire image display apparatus according to the first embodiment of the present invention. In this image display apparatus, a pair of reading light sources 2 are disposed for illumination of the SLM 1. After an image has been written to the SLM 1, if the reading light sources 2 are turned on, the user can view the image written to the SLM 1.

Each of the reading light sources 2 includes a light emission source using a cold cathode fluorescent lamp or the like, a reflector, a diffuser and the like, and is arranged to approximately uniformly illuminate the SLM 1. Incidentally, although the two reading light sources 2 are shown in FIG. 5(*a*), the number of reading light sources may be arbitrarily selected according to the required uniformity and brightness of illumination. A light source which has spectral characteristics to optimize the color reproduction of a read image is selected as each of the reading light sources 2.

In the first embodiment, a writing light source 3 is disposed in a lower portion of the image display apparatus, and includes a flash emission tube, such as a xenon tube, and a reflector. Light emitted from the writing light source 3 passes through a condenser lens 4 and is transmitted through a diffuser 5 and approximately uniformly illuminates a film (original) 6. When an image recorded on the film 6 is illuminated with the light emitted from the writing light source 3, the image is projected on the SLM 1 by a projecting lens 9 and a mirror 10. Normally, an image to be written, which is recorded on the film 6, is enlarged to a size equivalent to the size of the picture area of the SLM 1 and is projected onto the SLM 1.

FIG. 5(*b*) is a view showing the arrangement of the constituent elements 3 to 9 as viewed in a direction perpendicular to the sheet surface of FIG. 5(*a*) (i.e., from the back side of the apparatus). The flash emission tube which serves as the writing light source 3 is disposed in parallel with the longitudinal direction of the image plane of the film 6, and the film 6 is fed out of a film cartridge 7 and wound around a spool 8.

The original film 6, which is an image original on which images to be written are recorded, need not necessarily be of the cartridge-accommodated type, and may also be, for example, a roll-like film or a sheet-like film.

An external-light sensor (amount-of-external-light detecting means) 11 uses a photoelectric conversion element such as a photodiode or a phototransistor, and is disposed below the screen of the SLM 1 to detect the amount of external light which illuminates the SLM 1 on the outside of the apparatus. An amount-of-writing-light sensor 12 includes a photoelectric conversion element such as a photodiode or a phototransistor, an element which integrates the output current of the photoelectric conversion element, and the like. The amount-of-writing-light sensor 12 is disposed at a position where part of the reflected component of the writing light projected on the SLM 1 is made incident on the amount-of-writing-light sensor 12, and is arranged to detect the amount of writing light during writing. Incidentally, a lens before the amount-of-writing-light sensor 12 may be disposed as required. The reading light sources 2 and the amount-of-writing-light sensor 12 are disposed at positions which do not block a writing optical path.

An operating switch 13 includes a display switch, a frame feed switch and the like as will be described later, and is disposed at a position which enables the user to easily operate the operating switch 13 while viewing the screen of the SLM 1.

A circuit block 14 is disposed in the bottom portion of the apparatus. As shown in FIG. 6, the circuit block 14 includes the above-described voltage applying means 16, film transporting means 17 for winding or rewinding the film 6 by driving the rotating shaft of the film cartridge 7 or the spool 8 by means of a motor or the like, and control means 15 using a microcomputer or the like. The control means 15 controls the voltage applying means 16, the film transporting means 17, the reading light sources 2 and the writing light source 3 in accordance with a predetermined program according to the outputs of the operating switch 13, the external-light sensor 11 and the amount-of-writing-light sensor 12.

A specific operation sequence of the control means 15 (a control circuit including a microcomputer) will be described below with reference to the flowcharts of FIGS. 7 and 8. First, reference will be made to FIG. 7 which shows a flowchart for controlling the entire operation of the apparatus.

If a power source switch (not shown) is turned on to make the control means 15 operable, the control means 15 initializes the required memory, output signals and the like in Step 001. In Step 001, the writing light source 3 and the reading light sources 2 are turned off, and the voltage applying means 16 does not provide any output.

In Step 002, the process waits for the film cartridge 7 to be loaded into the apparatus. If the film cartridge 7 is loaded, the process proceeds to Step 003. In Step 003, the control means 15 outputs a signal to the film transporting means 17 to cause it to start feeding the film 6 out of the film cartridge 7. Then, in Step 004, the photographic picture of the first frame of the film 6 is set to a writing position, and the process proceeds to Step 005, in which the control means 15 stops outputting the signal to the film transporting means 17 to bring film feeding to an end.

Then, in Step 006, the process waits for the display switch included in the operating switch 13 to be turned on. If the display switch is turned on, the process proceeds to Step 007, in which the control means 15 executes a sequence for writing an image on the film 6 to the SLM 1. This image writing sequence will be described later.

After the image writing sequence has been executed in Step 007, the process proceeds to Step 008, in which the control means 15 reads the output of the external-light sensor 11 to obtain information indicative of the amount of external light. Then, in Step 009, the control means 15 turns on the reading light sources 2 to cause it to provide an optimum brightness, on the basis of the information indicative of the amount of external light. Thus, the image written to the SLM 1 becomes visible.

Then, in Step 010, the control means 15 checks whether the frame feed switch included in the operating switch 13 has been turned on. If the frame feed switch is off, the process proceeds to Step 011, in which the control means 15 checks whether the display switch included in the operating switch 13 has been turned on. If the display switch is continuously on from the time point of Step 006, the process returns to Step 010, and repeats Steps 010 and 011 for checking the states of the respective switches. If the display switch is off, the process proceeds to Step 012, in which the control means 15 turns off the reading light sources 2. Thus, the image written to the SLM 1 becomes invisible.

Then, in Step 013, the control means 15 outputs a control signal to the voltage applying means 16 so that a voltage of opposite polarity to the voltage applied during the image writing is applied to each electrode of the SLM 1. Thus, the image written to the SLM 1 is erased. Then, in Step 014, the control means 15 outputs a signal to the film transporting means 17 to cause it to start rewinding the film 6. In Step 015, the process waits until the film 6 is completely rewound into the film cartridge 7 and the film rewinding is completed. Then, the process proceeds to Step 017, in which the control means 15 stops outputting the signal to the film transporting means 17 and brings the film rewinding to an end.

On the other hand, if the control means 15 determines in Step 010 that the frame feed switch has been turned on, the process proceeds to Step 017, in which the control means 15 turns off the reading light sources 2. Thus, the image written to the SLM 1 becomes invisible. Then, the process proceeds to Step 018, in which the control means 15 outputs a signal to the film transporting means 17 to cause it to start winding the film 6. In Step 019, the photographic picture of the next frame of the film 6 is set to the writing position. After the completion of setting, the process proceeds to Step 020, in which the control means 15 stops outputting the signal to the film transporting means 17 to bring the film winding to an end.

After the completion of Step 020, the process returns to Step 007, in which the control means 15 again executes the image writing sequence, and turns on the reading light sources 2 in Step 009. Thus, the images of the second and following frames become visible.

The image writing sequence executed in Step 007 will be described below with reference to the flowchart of FIG. 8.

In Step 101, an image erasing operation is performed because an image may occasionally be already written to the SLM 1. Specifically, the control means 15 outputs a control signal to the voltage applying means 16 so that a voltage of opposite polarity to the voltage applied during the image writing is applied to each electrode of the SLM 1. Thus, in Step 102, the control means 15 reads the output of the external-light sensor 11 to obtain information indicative of the amount of external light. Then, in Step 103, the control means 15 determines the value of a voltage to be applied to the SLM 1 during image writing (an image storage operation condition), on the basis of the information indicative of the amount of external light. The value of such voltage is determined in such a way as to, if external light is present, make the value of the applied voltage small with respect to the value of a particular reference applied voltage which is required under the condition that external light can be regarded as being absent, on the basis of the characteristics described previously with reference to FIG. 4.

Then, in Step 104, the control means 15 outputs a signal to the voltage applying means 16 to cause it to apply the voltage determined in Step 103 to the electrodes of the SLM 1. Then, in Step 105, the control means 15 turns on the writing light source 3 to cause it to start projecting an image from the film 6 onto the SLM 1, and in Step 106 the control means 15 start reading the output of the amount-of-writing-light sensor 12. Incidentally, writing light which is being detected by the amount-of-writing-light sensor 12 is a reflected component of the light projected on the SLM 1 through the image to be written, which is recorded on the film 6, and contains information indicative of the density of the image to be written.

In Step 107, the control means 15 monitors the output of the amount-of-writing-light sensor 12 (an output corresponding to the integral value of the projected light), and waits until a preset predetermined amount of light optimum for image writing is projected on the SLM 1. This predetermined amount of light is a constant amount of light irrespective of the density of the image to be written. Accordingly, as long as the intensity (brightness) of the illuminating light of the writing light source 3 is the same, if the image to be written is light in color, the amount of writing light reaches the predetermined amount of light in a short time, whereas if the image to be written is deep in color, the amount of writing light reaches the predetermined amount of light in a long time.

When the predetermined amount of light which has reached an optimum amount of writing light is projected on the SLM 1 in this manner, the process proceeds to Step 108, in which the control means 15 turns off the writing light source 3. Then, in Step 109, the control means 15 stops outputting the control signal to the voltage applying means 16, and stops the application of the writing voltage to the electrodes of the SLM 1.

In the above-described image writing sequence, after an optimum voltage to be applied to the SLM 1 has been determined according to the amount of external light, a predetermined amount of writing light which enables optimum image writing to be performed irrespective of the density of film images is made incident on the SLM 1. Accordingly, it is possible to effect optimum image writing irrespective of external light or the density of film images.

(Second Embodiment)

Although the first embodiment is arranged to determine an optimum voltage to be applied to the SLIM 1 according to the amount of external light and perform image writing, a second embodiment is arranged to determine an optimum amount of writing light according to the amount of external light and perform image writing.

Figure 7:
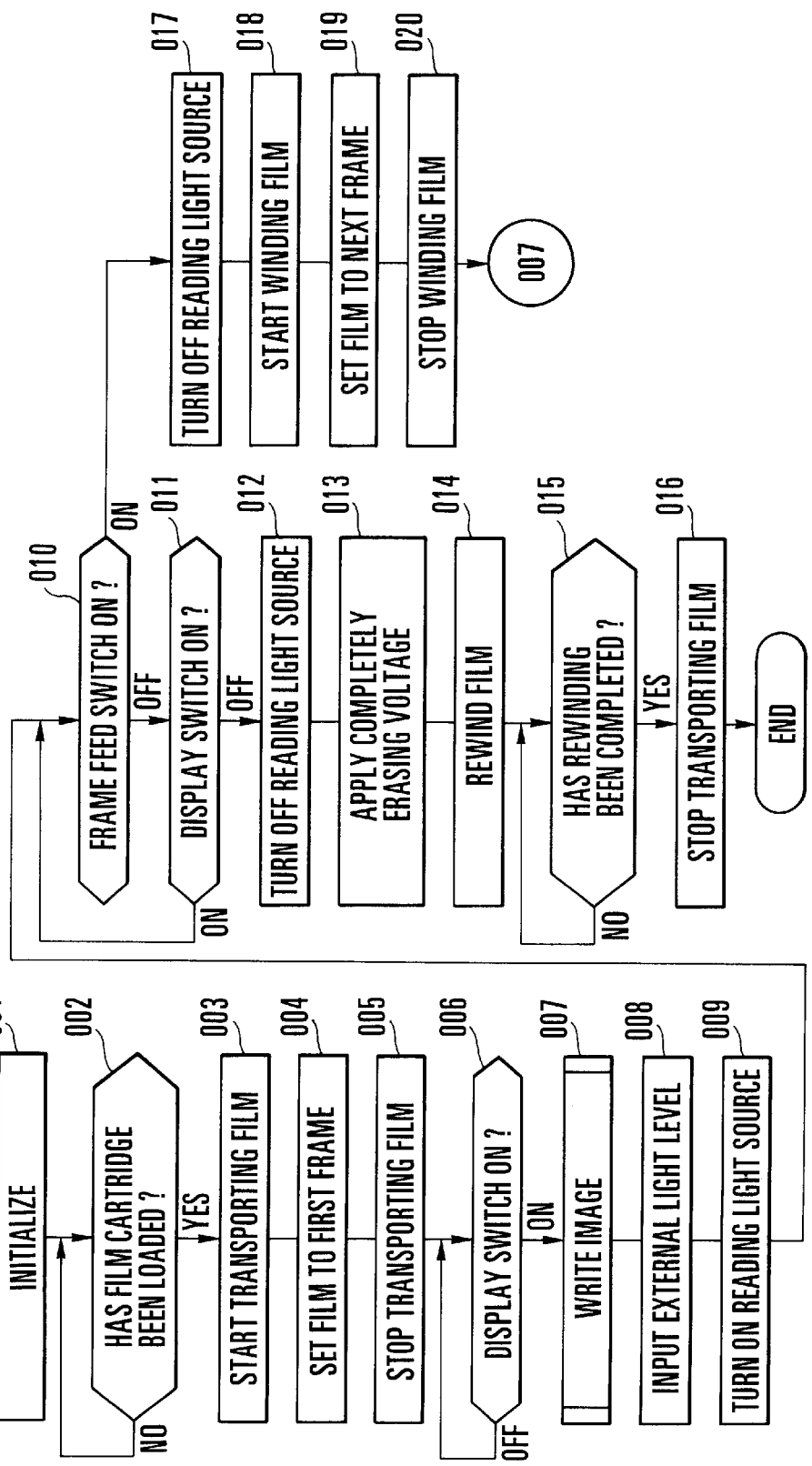
FIG. 7 is a flowchart showing the operation sequence of the image display apparatus according to the first embodiment of the present invention.
Figure 8:
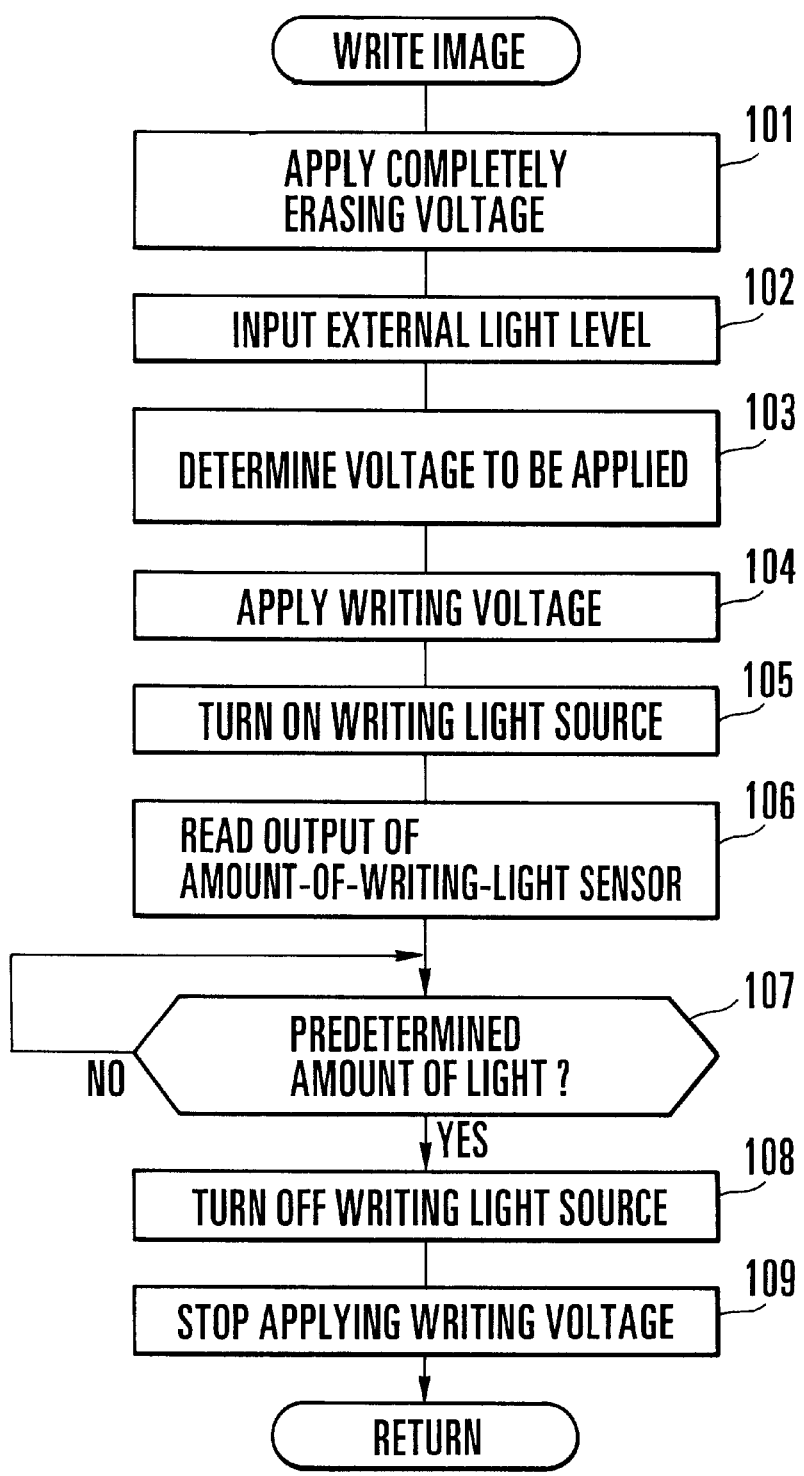
FIG. 8 is a flowchart showing the operation sequence of the image display apparatus according to the first embodiment of the present invention.
Figure 9:
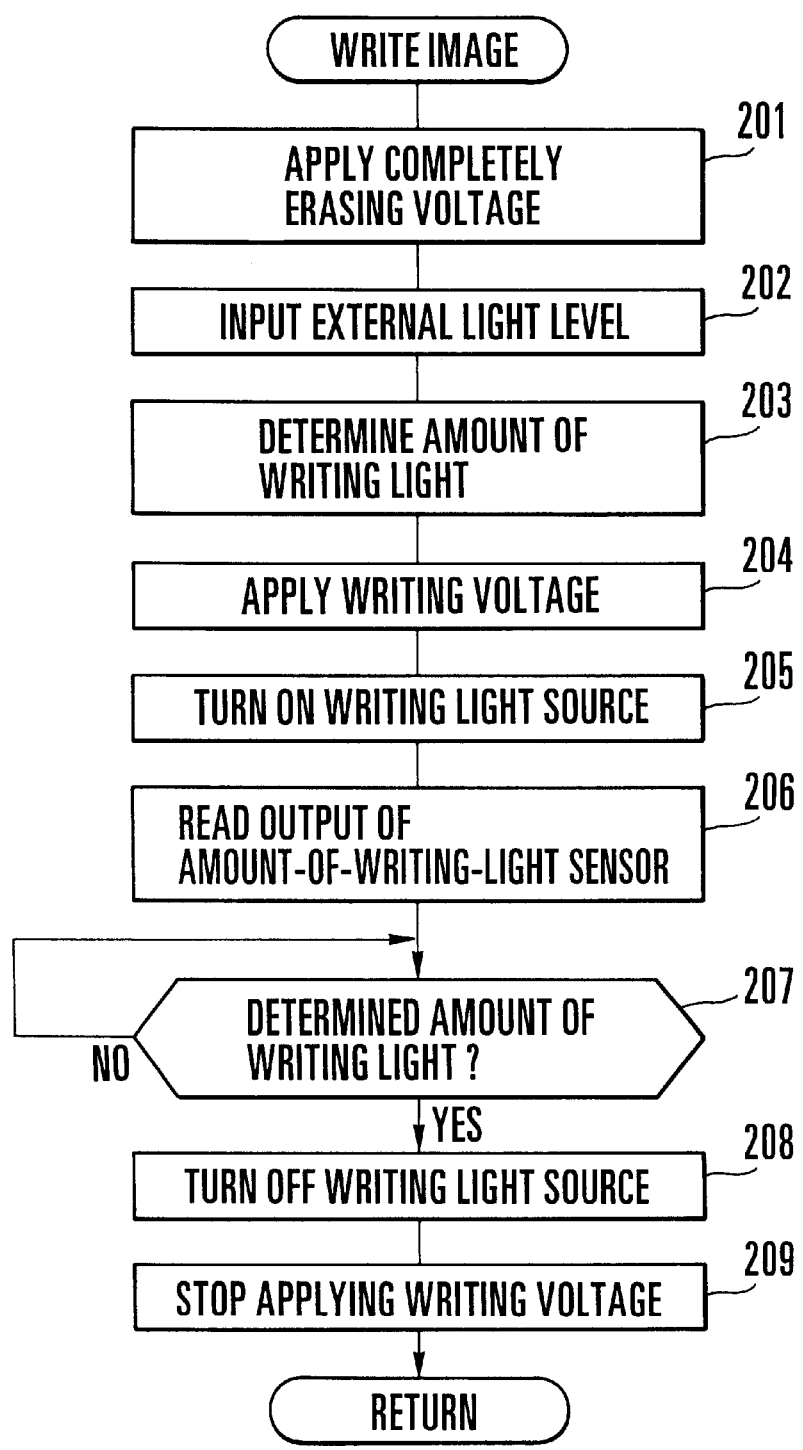
FIG. 9 is a flowchart showing the operation sequence of an image display apparatus according to a second embodiment of the present invention.

Incidentally, the second embodiment can be carried out with an apparatus having an arrangement identical to that of the image display apparatus described previously in connection with the first embodiment, and the entire operation sequence of the control means 15 may use the sequence shown in FIG. 7. However, the image writing sequence executed in Step 007 of FIG. 7 uses the sequence shown in FIG. 9. The following description will refer to the image writing sequence shown in FIG. 9.

In Step 201, an image erasing operation is performed because an image may occasionally be already written to the SLM 1. Specifically, the control means 15 outputs a control signal to the voltage applying means 16 so that a voltage of opposite polarity to the voltage applied during the image writing is applied to each electrode of the SLM 1.

Then, in Step 202, the control means 15 reads the output of the external-light sensor 11 to obtain information indicative of the amount of external light. Then, in Step 203, the control means 15 determines the amount of writing light to be projected on the SLM 1 during image writing, on the basis of the information indicative of the amount of external light. The amount of such writing light is determined in such a way as to, if external light is present, make the value of the amount of the writing light large with respect to the value of a predetermined reference amount of writing light which is required under the condition that external light can be regarded as being absent (i.e., the value of a predetermined amount of writing light which enables optimum image writing to be performed irrespective of the density of an image to be written to the SLM 1), on the basis of the characteristics described previously with reference to FIG. 4.

Then, in Step 204, the control means 15 outputs a signal to the voltage applying means 16 to cause it to apply an image writing voltage to the electrodes of the SLM 1. Then, in Step 205, the control means 15 turns on the writing light source 3 to cause it to start projecting an image from the film 6 onto the SLM 1, and in Step 206 the control means 15 starts reading the output of the amount-of-writing-light sensor 12. Incidentally, writing light which is being detected by the amount-of-writing-light sensor 12 is a reflected component of the light projected on the SLM 1 through the image to be written, which is recorded on the film 6, and contains information indicative of the density of the image to be written.

In Step 207, the control means 15 monitors the output of the amount-of-writing-light sensor 12 (an output corresponding to the integral value of the projected light), and waits until the amount of writing light determined in Step 203 according to external light is projected on the SLM 1.

When the amount of writing light determined in Step 203 is projected on the SLM 1 in this manner, the process proceeds to Step 208, in which the control means 15 turns off the writing light source 3. Then, in Step 209, the control means 15 stops outputting the control signal to the voltage applying means 16, and stops the application of the writing voltage to the electrodes of the SLM 1.

In the above-described image writing sequence, an optimum amount of writing light to be projected on the SLM 1 according to the amount of external light, i.e., the amount of light obtained by correcting according to the amount of external light a predetermined amount of writing light which enables optimum image writing to be performed irrespective of the density of film images, is made incident on the SLM 1. Accordingly, it is possible to effect optimum image writing irrespective of external light or the density of film images.

Incidentally, if the image writing sequence of the second embodiment and the image writing sequence of the first embodiment are combined to control both the amount of writing light and the applied voltage of the SLM 1 during writing according to the amount of external light, it is possible to obtain a read image of far higher image quality.

(Third Embodiment)

Figure 10:
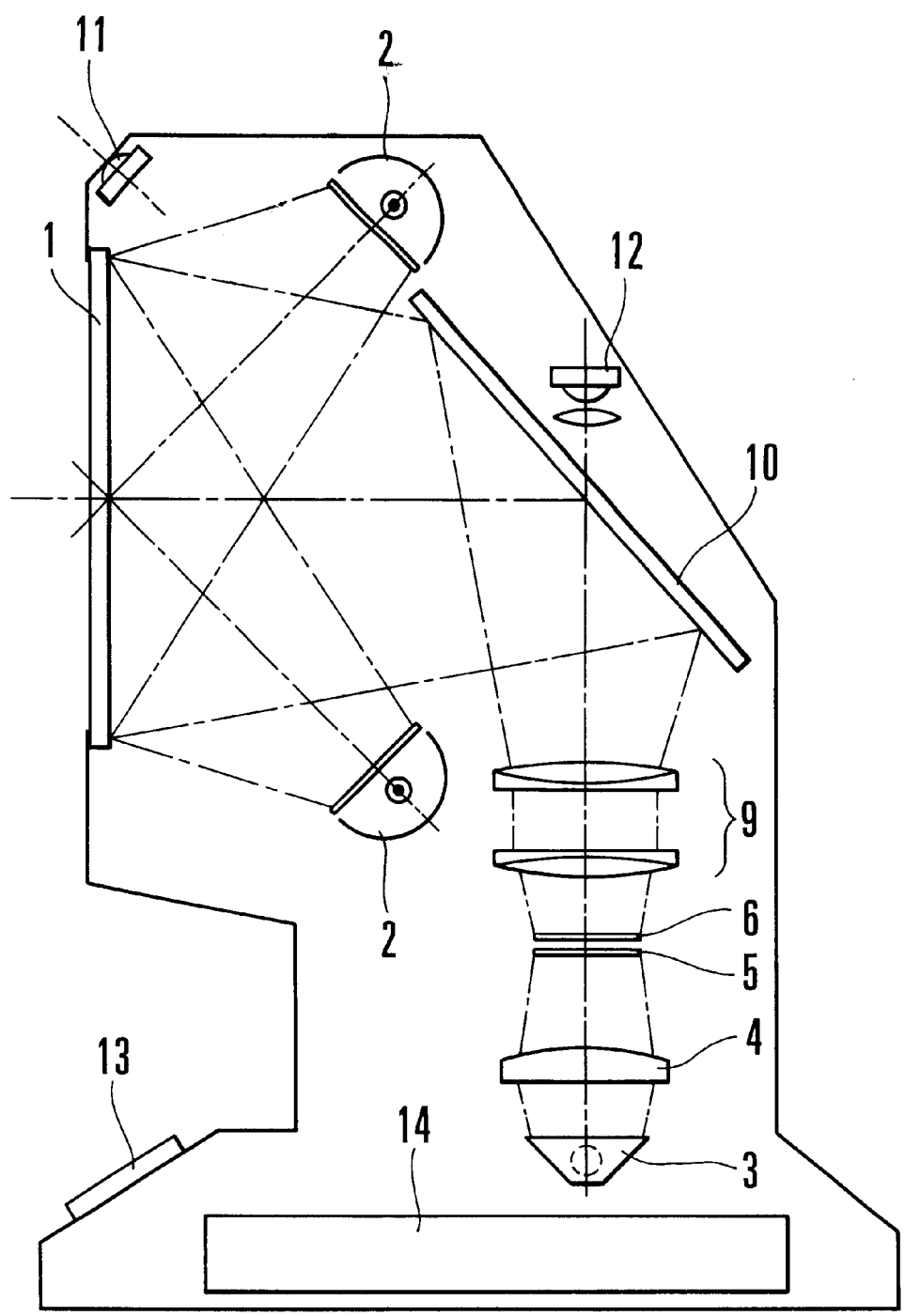
FIG. 10 is a diagrammatic view of the entire layout of an image display apparatus according to a third embodiment of the present invention.

Although each of the first and second embodiments has the external-light sensor 11 disposed below the screen of the SLM 1 as shown in FIG. 5(*a*) and is arranged to cause the amount-of-writing-light sensor 12 to detect a reflected component of the writing light projected on the SLM 1, the external-light sensor 11 may be disposed above the screen of the SLM 1 as shown in FIG. 10 and a half-mirror may be used as the mirror 10 so that a direct component of writing light is transmitted through the mirror 10 and the amount-of-writing-light sensor 12 detects this transmitted light.

In particular, if the SLM 1 is of the type in which diffuse reflection of writing light does not easily occur on its surface, it is possible to detect an accurate amount of writing light, as compared with the arrangement of the amount-of-writing-light sensor 12 shown in FIG. 5(*a*).

(Fourth Embodiment)

Figure 11:
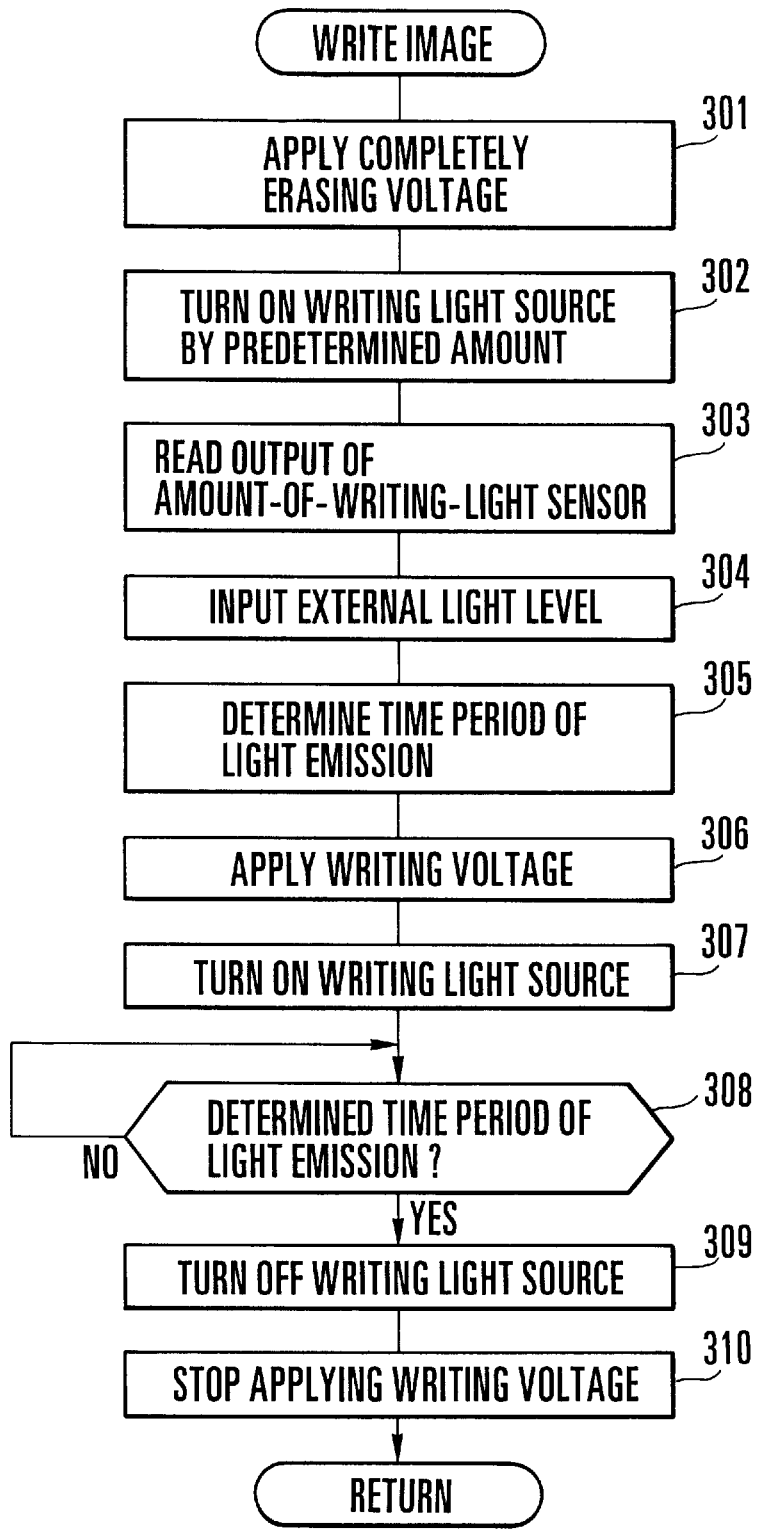
FIG. 11 is a flowchart showing the operation sequence of an image display apparatus according to a fourth embodiment of the present invention.

Although, in the second embodiment, writing of an image to the SLM 1 is performed after an optimum amount of writing light according to the amount of external light has been determined, in a fourth embodiment, writing of an image to the SLM 1 is performed after an optimum writing time period according to the amount of external light (the light emission time period of the writing light source 3) has been determined. Incidentally, the fourth embodiment may use either of the image display apparatus shown in FIGS. 5(*a*) and 10, and the entire operation sequence of the control means 15 may be that shown in FIG. 7. However, the image writing sequence executed in Step 007 of FIG. 7 uses the sequence shown in FIG. 11. The following description will refer to the image writing sequence shown in FIG. 11.

In Step 301, an image erasing operation is performed because an image may occasionally be already written to the SLM 1. Specifically, the control means 15 outputs a control signal to the voltage applying means 16 so that a voltage of opposite polarity to the voltage applied during the image writing is applied to each electrode of the SLM 1.

Then, in Step 302, the control means 15 performs a preliminary light emission which causes the writing light source 3 to emit light by a predetermined amount of light emission, without application of a writing voltage to the voltage applying means 16. Since a writing voltage is not applied to the voltage applying means 16, writing of an image to the SLM 1 is not yet performed. Then, in Step 303, the control means 15 reads the output of the amount-of-writing-light sensor 12 that corresponds to the preliminary light emission. Incidentally, the output of the amount-of-writing-light sensor 12 is a component of the light transmitted through the image to be written, which is recorded on the film 6, and contains information indicative of the density of the image to be written.

Then, in Step 304, the control means 15 reads the output of the external-light sensor 11 to obtain information indicative of the amount of external light. Then, in Step 305, the control means 15 determines a time period (target time period of incidence) for which the writing light source 3 needs to be made to emit light during writing of the image to the SLM 1, on the basis of the information indicative of the density of the image to be written, obtained in Step 303, and the information indicative of the amount of external light, obtained in Step 304. The time period of such light emission is determined in such a way as to make the time period of light emission longer as the density of an image to be written is higher (i.e., as the amount of light indicated by information obtained in Step 303 is smaller), with respect to the value of a predetermined reference amount of writing light which is required under the condition that external light can be regarded as being absent (i.e., the value of the amount of writing light which enables optimum image writing to be performed with respect to the density of a standard image to be written), on the basis of the characteristics described previously with reference to FIG. 4. Otherwise, the time period of such light emission is determined in such a way as to, if external light is present, make the time period of light emission long with respect to the value of such predetermined reference amount of writing light, on the basis of the characteristics described previously with reference to FIG. 4.

Then, in Step 306, the control means 15 outputs a control signal to the voltage applying means 16 to cause it to apply a predetermined image writing voltage to the electrodes of the SLM 1. Then, in Step 307, the control means 15 turns on the writing light source 3 (a main light emission) to cause it to start projecting the image from the film 6 onto the SLM 1.

Then, in Step 308, the process waits until the time period of light emission determined in Step 305 elapses and the amount of light optimum for image writing is projected on the SLM 1. When the time period of light emission elapses, the process proceeds to Step 309, in which the control means 15 turns off the writing light source 3. Then, in Step 310, the control means 15 stops outputting the control signal to the voltage applying means 16, and stops the application of the writing voltage to the electrodes of the SLM 1.

In the above-described image writing sequence, the control means 15 causes the writing light source 3 to perform a preliminary light emission and obtains density information relative to the density of an image recorded on the film 6 and also detects the amount of external light, and determines a time period optimum for image writing to the SLM 1 according to the density information and information indicative of the detected amount of external light. Then, the control means 15 causes the writing light source 3 to perform a main light emission by the time period to write an image to the SLM 1. Accordingly, it is possible to effect optimum image writing irrespective of external light or the density of film images.

Incidentally, although the above-described fourth embodiment is arranged so that the control means 15 determines a writing target time period according to the amount of external light and performs writing of an image to the SLIM 1, the control means 15 may also be arranged to determine a target amount of writing light instead of the writing target time period and cause the writing light source 3 to perform a main light emission until the amount of writing light projected on the SLM 1 reaches the target amount of writing light.

(Fifth Embodiment)

Figure 12:
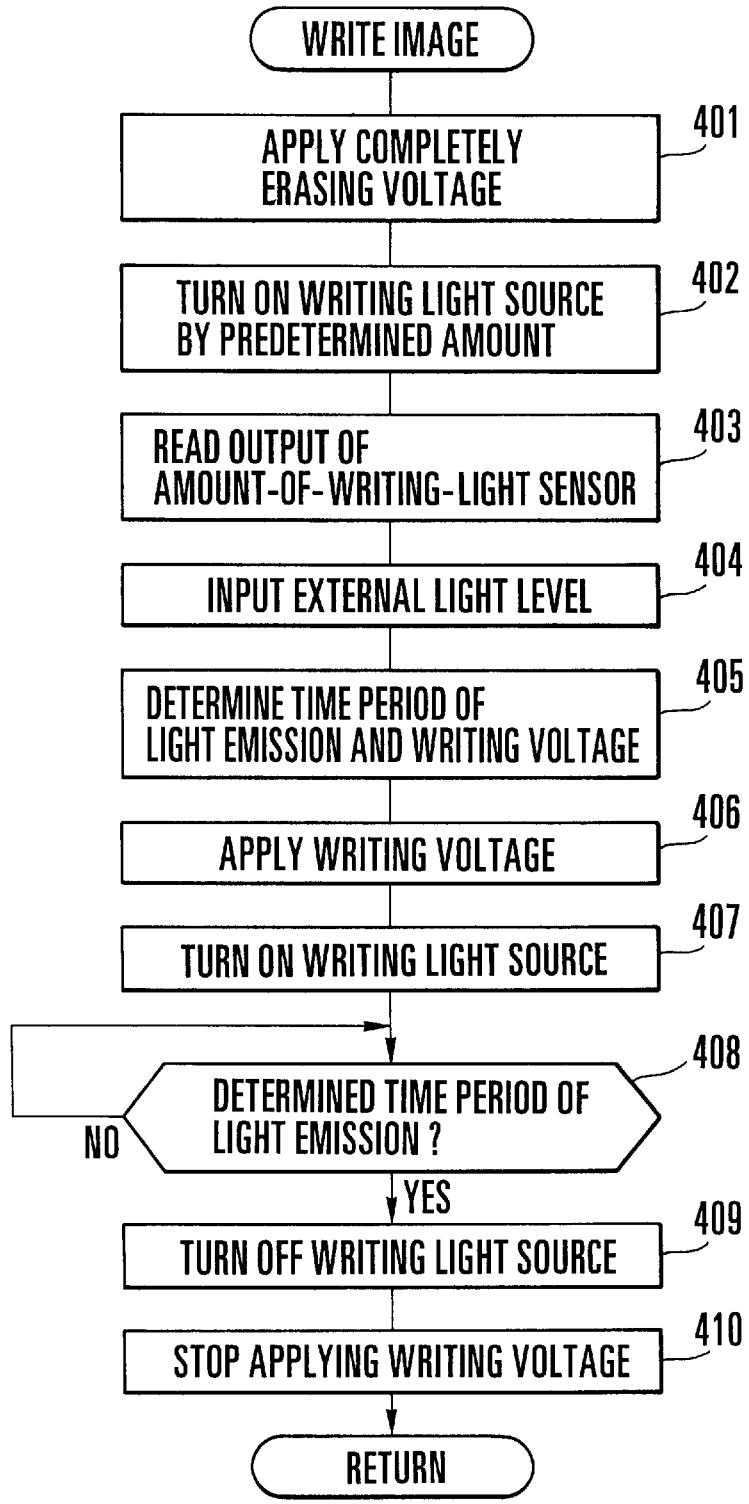
FIG. 12 is a flowchart showing the operation sequence of an image display apparatus according to a fifth embodiment of the present invention.

Although the above-described fourth embodiment is arranged so that the control means 15 determines a light emission time period optimum for image writing to the SLM 1 according to density information relative to an image to be written and the amount of external light, by means of a preliminary light emission from the writing light source 3, a fifth embodiment is arranged to further determine an optimum voltage to be applied to the SLIM 1 according to the density the image to be written and the amount of external light. Incidentally, the fifth embodiment may use either of the image display apparatus shown in FIGS. 5(a) and 10, and the entire operation sequence of the control means 15 may be that shown in FIG. 7. However, the image writing sequence executed in Step 007 of FIG. 7 uses the sequence shown in FIG. 12. The following description will refer to the image writing sequence shown in FIG. 12.

In Step 401, an image erasing operation is performed because an image may occasionally be already written to the SLIM 1. Specifically, the control means 15 outputs a control signal to the voltage applying means 16 so that a voltage of opposite polarity to the voltage applied during the image writing is applied to each electrode of the SLM 1.

Then, in Step 402, the control means 15 performs a preliminary light emission which causes the writing light source 3 to emit light by a predetermined amount of light emission, without application of a writing voltage to the voltage applying means 16. Since a writing voltage is not applied to the voltage applying means 16, writing of an image to the SLM 1 is not yet performed. Then, in Step 403, the control means 15 reads the output of the amount-of-writing-light sensor 12 that corresponds to the preliminary light emission. Incidentally, the output of the amount-of-writing-light sensor 12 is a component of the light transmitted through the image to be written, which is recorded on the film 6, and contains information indicative of the density of the image to be written.

Then, in Step 404, the control means 15 reads the output of the external-light sensor 11 to obtain information indicative of the amount of external light. Then, in Step 405, the control means 15 determines a time period (target time period of incidence) for which the writing light source 3 needs to be made to emit light during writing of the image to the SLM 1, and the value of a voltage applied to the SLM 1, on the basis of the information indicative of the density of the image to be written, obtained in Step 403, and the information indicative of the amount of external light, obtained in Step 404. The time period of such light emission is determined in a similar way to that described previously in connection with the fourth embodiment. The value of a voltage applied to the SLM 1 is determined in such a way as to, if external light is present, make the value of the applied voltage small with respect to the value of a particular reference applied voltage which is required under the condition that external light can be regarded as being absent, on the basis of the characteristics described previously with reference to FIG. 4.

Then, in Step 406, the control means 15 outputs a control signal to the voltage applying means 16 to cause it to apply the image writing voltage determined in Step 405 to the electrodes of the SLM 1. Then, in Step 407, the control means 15 turns on the writing light source 3 (a main light emission) to cause it to start projecting the image from the film 6 onto the SLM 1.

Then, in Step 408, the process waits until the time period of light emission determined in Step 405 elapses and the amount of light optimum for image writing is projected on the SLM 1. When the time period of light emission elapses, the process proceeds to Step 409, in which the control means 15 turns off the writing light source 3. Then, in Step 410, the control means 15 stops outputting the control signal to the voltage applying means 16, and stops the application of the writing voltage to the electrodes of the SLM 1.

In the above-described image writing sequence, the control means 15 causes the writing light source 3 to perform a preliminary light emission and obtains density information relative to the density of an image recorded on the film 6 and also detects the amount of external light, and determines a light emission time period optimum for image writing to the SLM 1 and an optimum voltage to be applied to the SLM 1, according to the density information and information indicative of the detected amount of external light. Then, the control means 15 causes the writing light source 3 to perform a main light emission by the light emission time period to write an image to the SLM 1. Accordingly, it is possible to effect optimum image writing irrespective of external light or the density of film images.

(Sixth Embodiment)

Figure 13:
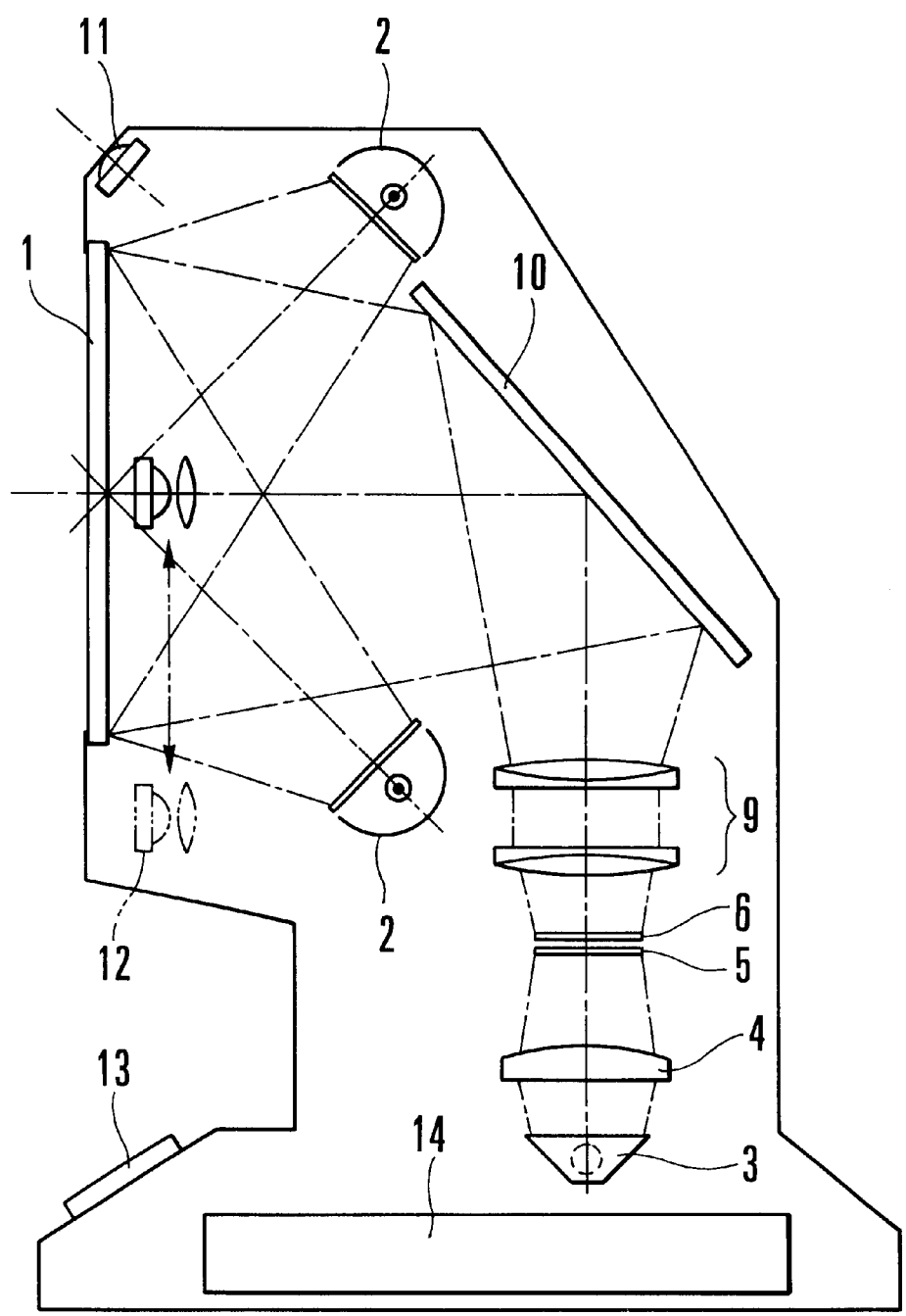
FIG. 13 is a diagrammatic view of the entire layout of an image display apparatus according to a sixth embodiment of the present invention.

Each of the image writing sequences of the third and fourth embodiments may be applied to either of the image display apparatus shown in FIGS. 5(*a*) and 10, and may also be applied to another type of apparatus, for example, the apparatus shown in FIG. 13.

In accordance with a sixth embodiment, in Step 303 of the third embodiment and Step 403 of the fourth embodiment, the light emitted from the writing light source 3 as a preliminary light emission needs only to be made incident on the amount-of-writing-light sensor 12.

Accordingly, it is possible to adopt an arrangement which, during a preliminary light emission of the writing light source 3, causes the amount-of-writing-light sensor 12 to be disposed at the position shown by solid lines in FIG. 13 (in the optical path of writing light), and then, during a main light emission of the writing light source 3, causes the amount-of-writing-light sensor 12 to retract to the position shown by dashed lines in FIG. 13 (from the optical path of writing light). Specifically, Step for setting the amount-of-writing-light sensor 12 at the position shown by the solid lines is inserted before Step 302 of FIG. 11 and before Step 402 of FIG. 12, and Step for retracting the amount-of-writing-light sensor 12 to the position shown by the dashed lines is inserted after Step 305 and after Step 405.

The adoption of the arrangement which moves the amount-of-writing-light sensor 12 in this manner makes it possible to avoid a drawback due to a reflection of writing light at the surface of the SLM 1 in the apparatus shown in FIGS. 5(*a*) and 5(*b*), and also has the merit of needing no half-mirror as the mirror 10, unlike the apparatus shown in FIG. 10.

(Seventh Embodiment)

Figure 14:
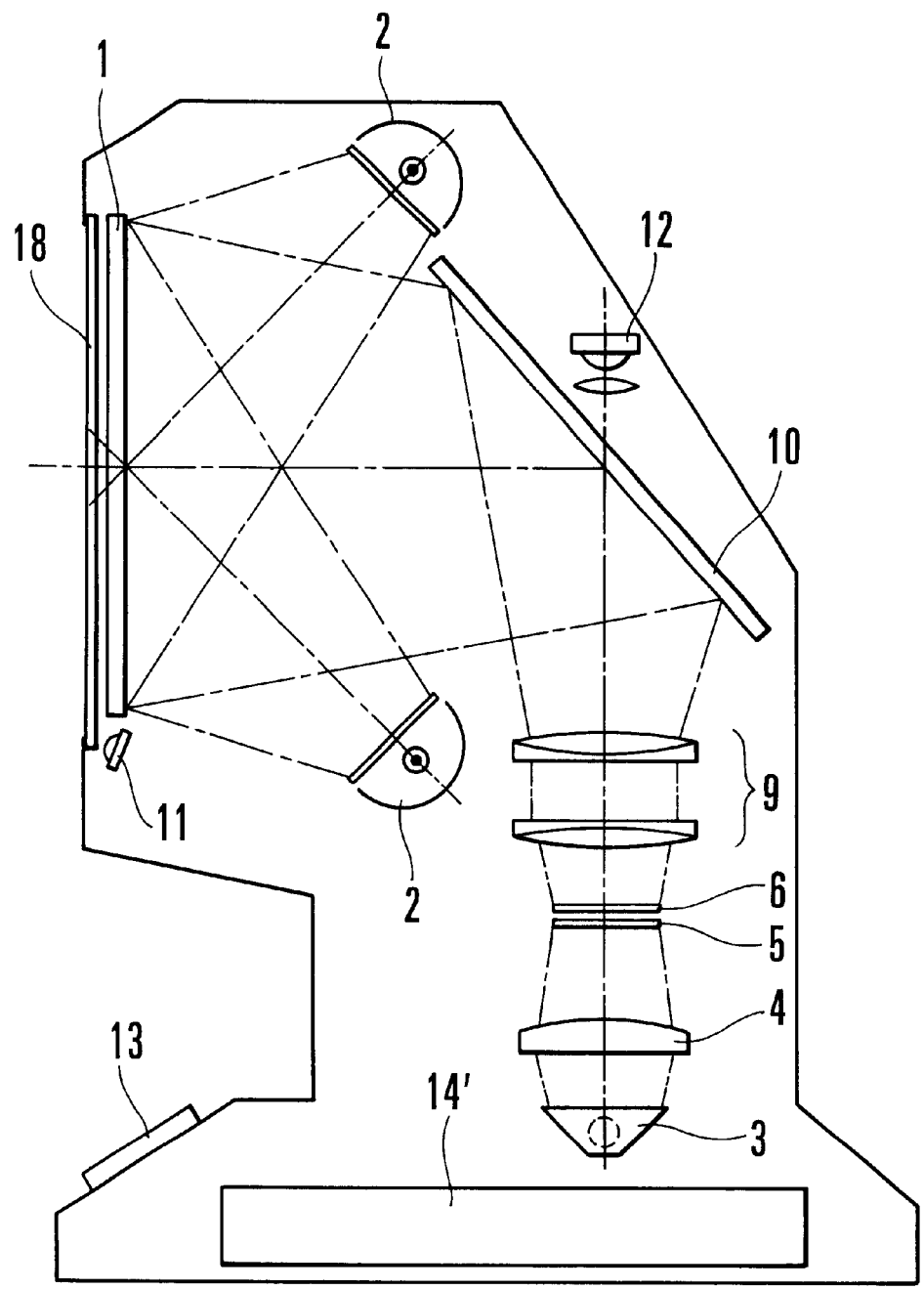
FIG. 14 is a diagrammatic view of the entire layout of an image display apparatus according to a seventh embodiment of the present invention.

The description of each of the first to sixth embodiments has referred to the case in which the amount (time period) of writing light to be projected on the SLM 1 or a voltage to be applied to the SLM 1 is controlled according to the amount of external light, but if the amount of external light exceeds a particular limit, an image of good image quality may not be obtained even if the amount of external light or the voltage is controlled. To cope with this problem, as shown in FIG. 14, an image display apparatus according to a seventh embodiment is provided with shutter means for blocking or reducing external light incident on the SLM 1 during image writing thereto. Incidentally, the basic construction of the apparatus shown in FIG. 14 is identical to that of the apparatus shown in FIG. 10, and in FIG. 14, reference numerals identical to those used in FIG. 10 are used to denote common constituent elements.

Shutter means 18 added to the apparatus shown in FIG. 14 is disposed in front of the SLM 1, and is arranged to decrease its ray transmittance during writing of an image to the SLM 1 so as to block or reduce external light, and to increase the ray transmittance during image reading so as to make the image written to the SLM 1 visible. The shutter means 18 is preferably selected from among various light control elements whose light transmittance varies according to the mode of application of an electrical signal, for example, electrochromic elements or various liquid crystal devices such as twisted-nematic liquid crystal devices, guest-host liquid crystal devices and polymer dispersion type liquid crystal devices.

Incidentally, in the apparatus shown in FIG. 14, the external-light sensor 11 is disposed inside the shutter means 18. During image writing, external light which leaks into the apparatus through the shutter means 18 which is in a light blocking state can be detected by the external-light sensor 11, and during image reading. During image reading, external light is detected through the shutter means 18 which is in a light transmitting state, and the detection result can be used as information for adjustment the brightness of the reading light sources 2.

Figure 15:
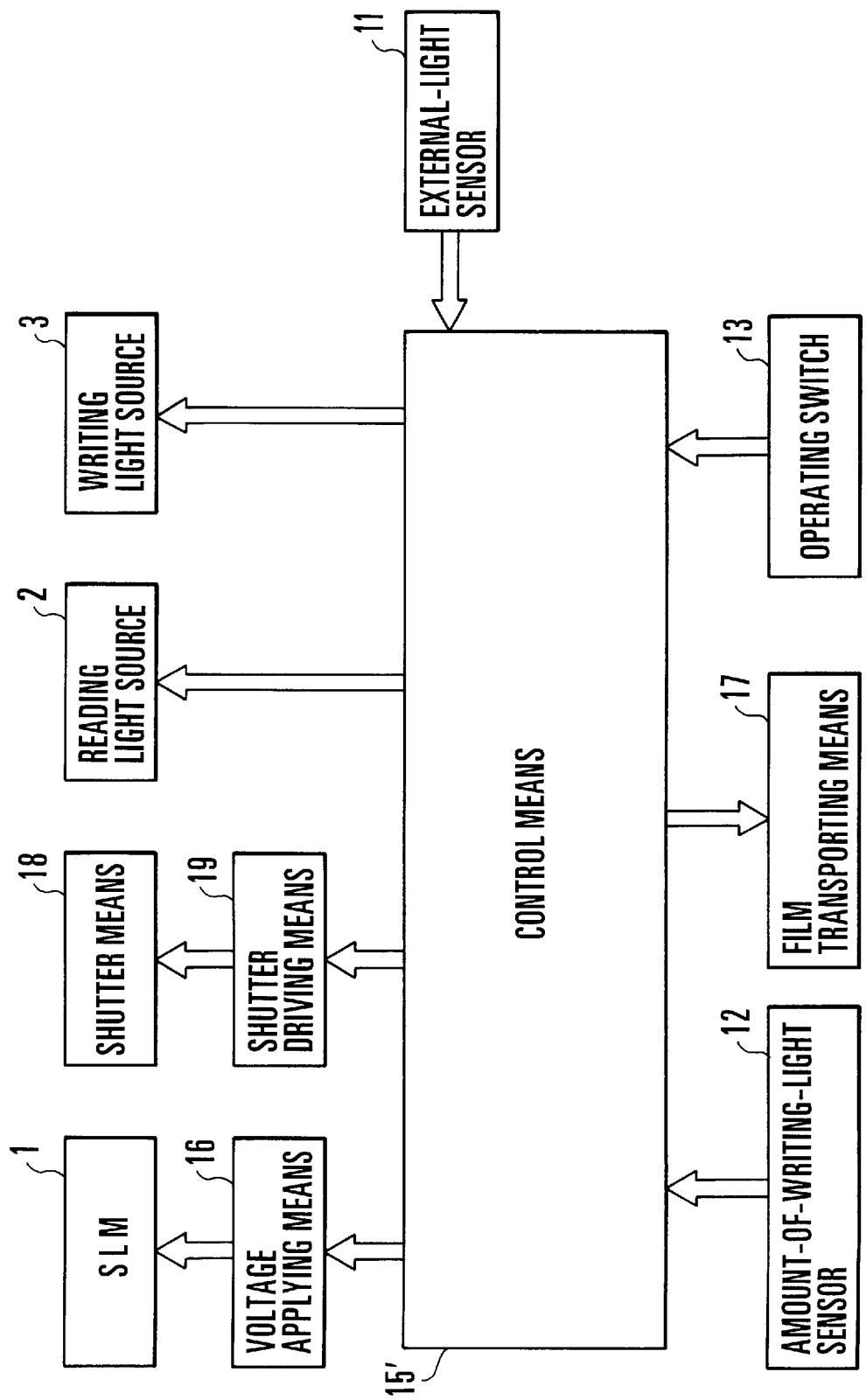
FIG. 15 is a block diagram of the electrical circuit of the image display apparatus according to the seventh embodiment of the present invention.

FIG. 15 shows the construction of a circuit block 14' of the apparatus shown in FIG. 14. Incidentally, the basic construction of the circuit block shown in FIG. 15 is identical to that of the circuit block shown in FIG. 6, and in FIG. 14, identical reference numerals are used to denote common constituent elements.

The circuit block 14' shown in FIG. 15 additionally includes shutter driving means 19 for controlling the transmittance of the shutter means 18. The shutter driving means 19 responds to a signal output from control means 15' and selectively provides for the shutter means 18 a signal output which brings the shutter means 18 into a light transmitting state and a signal output which brings the shutter means 18 into a light blocking state.

Figure 16:
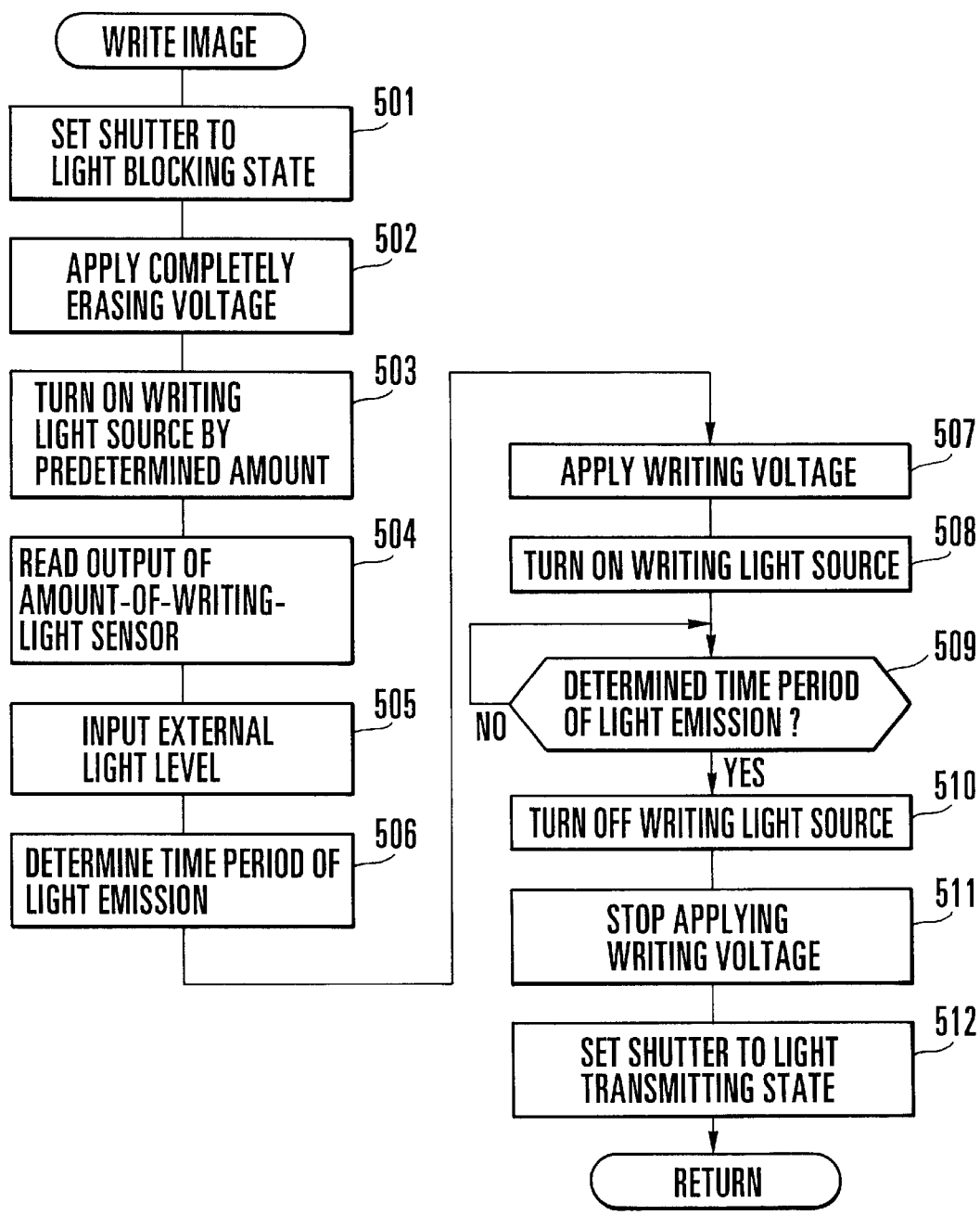
FIG. 16 is a flowchart showing the operation sequence of the image display apparatus according to the seventh embodiment of the present invention.

In the apparatus of the seventh embodiment having the shutter means 18, the entire operation sequence of the control means 15' is identical to the sequence shown in FIG. 7. However, the image writing sequence executed in Step 007 of FIG. 7 uses the sequence shown in FIG. 16. The following description will refer to the image writing sequence shown in FIG. 16.

In Step 501, the control means 15' outputs a signal to the shutter driving means 19 to bring the shutter means 18 into a light blocking state. Thus, it is possible to prevent the user from being dazzled by writing light passing through the SLM 1 outwardly during a later light emission from the writing light source 3. Then, in Step 502, an image erasing operation is performed because an image may occasionally be already written to the SLM 1. Specifically, the control means 15' outputs a control signal to the voltage applying means 16 so that a voltage of opposite polarity to the voltage applied during the image writing is applied to each electrode of the SLM 1.

Then, in Step 503, the control means 15' performs a preliminary light emission which causes the writing light source 3 to emit light by a predetermined amount of light emission, without application of a writing voltage to the voltage applying means 16. Since a writing voltage is not applied to the voltage applying means 16, writing of an image to the SLM 1 is not yet performed. Then, in Step 504, the control means 15' reads the output of the amount-of-writing-light sensor 12 that corresponds to the preliminary light emission. Incidentally, the output of the amount-of-writing-light sensor 12 is a component of the light transmitted through the image to be written, which is recorded on the film 6, and contains information indicative of the density of the image to be written.

Then, in Step 505, the control means 15' reads the output of the external-light sensor 11 to obtain information indicative of the amount of external light. Then, in Step 506, the control means 15' determines a time period (target time period of incidence) for which the writing light source 3 needs to be made to emit light during writing of the image to the SLM 1, on the basis of the information indicative of the density of the image to be written, obtained in Step 504, and the information indicative of the amount of external light, obtained in Step 505. The time period of such light emission is determined in a way identical to that described previously in connection with the fourth embodiment. Incidentally, if the light blocking performance of the shutter means 18 is so superior that account need not be taken into the influence of external light during writing, the time period of light emission of the writing light source 3 can be determined in accordance with only information indicative of the density of an image to be written, obtained in Step 504.

Then, in Step 507, the control means 15' outputs a control signal to the voltage applying means 16 to cause it to apply a predetermined image writing voltage to the electrodes of the SLM 1. Then, in Step 508, the control means 15' turns on the writing light source 3 (a main light emission) to cause it to start projecting the image from the film 6 onto the SLM 1.

Then, in Step 509, the process waits until the time period of light emission determined in Step 506 elapses and the amount of light optimum for image writing is projected on the SLM 1. When the time period of light emission elapses, the process proceeds to Step 510, in which the control means 15' turns off the writing light source 3. Then, in Step 511, the control means 15' stops outputting the control signal to the voltage applying means 16, and stops the application of the writing voltage to the electrodes of the SLM 1. Thus, the control means 15' can determine the time period of image writing optimum for the density of an image to be written, while inhibiting the influence of external light on the shutter means 18, and effect writing of the image to the SLM 1.

Then, the process proceeds to Step 512, in which the control means 15' sends a signal to the shutter driving means 19 to bring the shuter means 18 into a light transmitting state. In this state, if the reading light source 2 is turned on, the image written to the SLM 1 becomes visible.

Although the description of each of the above embodiments has referred to an image display apparatus which uses a liquid crystal type of spatial light modulator as storage display means, the present invention can also be applied to an image display apparatus which uses a spatial light modulator of a type other than the liquid crystal type, for example, a spatial light modulator using an ECD (electrochromic display), or another type of storage display means.

As is apparent from the above description, in accordance with any of the first to seventh embodiments, since the amount of light which can effect writing of an image which conforms with the range of reproduction of the tone of an image to be read from the storage display means is made incident on the storage display means irrespective of the density of the image to be written, the user can view an image of high image quality.

Incidentally, since the amount of writing light and an image storage operation condition (such as an applied voltage) of the storage display means are determined according to the amount of external light, it is possible to effect writing of an original image irrespective of the influence of external light.

In addition, by obtaining density information relative to an image to be written, by means of a preliminary light emission performed before a main light emission of writing illuminating means, and determining the amount of writing light to be projected on the storage display means or the time period of writing thereto or the operation condition of the storage display means, it is possible to more reliably write an image which conforms with the range of reproduction of the tone of an image to be read from the storage display means.

Furthermore, if writing light detecting means is disposed in a writing optical path during a preliminary light emission so that the writing light detecting means can be retracted from the writing optical path during a main light emission, it is possible to avoid a drawback which occurs when it is impossible to correctly detect writing light with light reflected at the storage display means, and it is also possible to detect writing light without the need to divide the writing light by using a half-mirror or the like.

Furthermore, if light blocking means for blocking the incidence of external light on the writing light detecting means and the storage display means during the writing light detection of the writing light detecting means and during the image storage operation of the storage display means is provided, the influence of external light to image writing can be eliminated and a user can view an image of far higher image quality. In addition, since it is possible to prevent external light from passing through the storage display means outwardly during the light emission of a writing light source, it is also possible to obtain the effect of preventing the user from being dazzled.

(Eighth Embodiment)

FIG. 17(*a*) shows the layout of the entire image display apparatus according to an eighth embodiment of the present invention. In this image display apparatus, a pair of reading light sources 602 are disposed for illumination of an SLM 601. After an image has been written to the SLM 601, if the reading light sources 602 are turned on, a user can view the image written to the SLM 601.

Figure 17A:
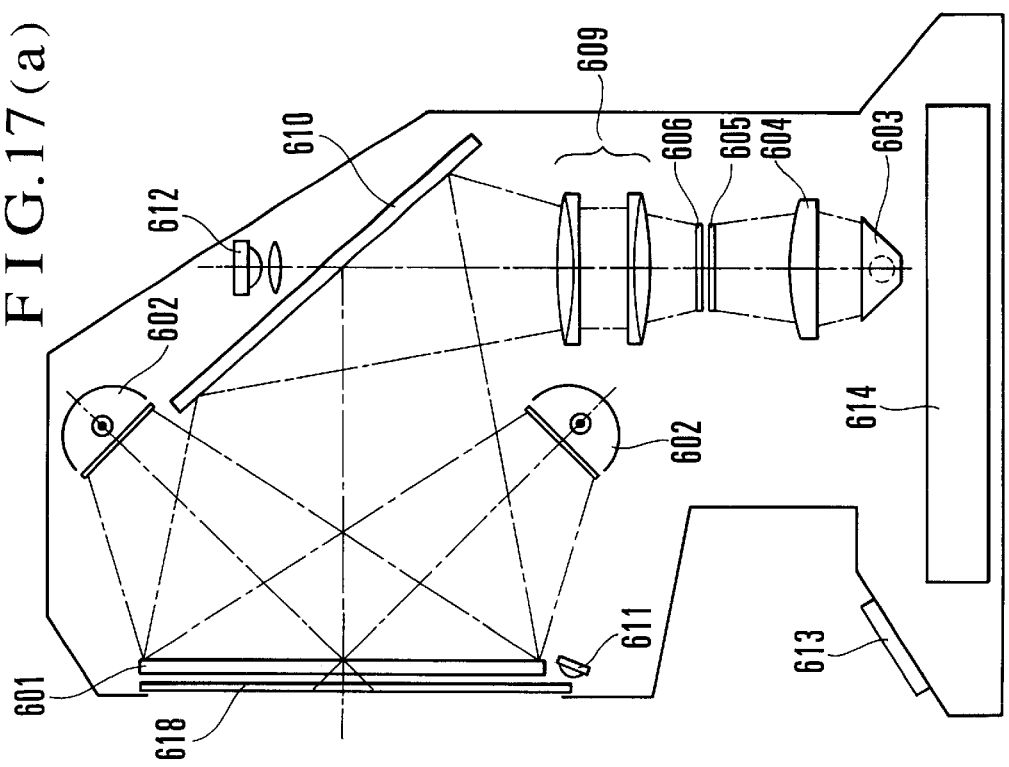
FIGS. 17(a) and 17(b) are diagrammatic layout views respectively showing the whole and a part of an image display apparatus according to an eighth embodiment of the present invention.

Each of the reading light sources 602 includes a light emission source using a cold cathode fluorescent lamp or the like, a reflector, a diffuser and the like, and is arranged to approximately uniformly illuminate the SLM 601. Incidentally, although the two reading light sources 602 are shown in FIG. 17(a), the number of reading light sources may be arbitrarily selected according to the required uniformity and brightness of illumination. A light source which has spectral characteristics to optimize the color reproduction of a read image is selected as each of the reading light sources 602.

In the eighth embodiment, a writing light source 603 is disposed in a lower portion of the image display apparatus, and includes a flash emission tube, such as a xenon tube, and a reflector. Light emitted from the writing light source 603 passes through a condenser lens 604 and is transmitted through a diffuser 605 and approximately uniformly illuminates a film (original) 606. When an image recorded on the film 606 is illuminated with the light emitted from the writing light source 603, the image is projected on the SLM 601 by a projecting lens 609 and a mirror 610. Normally, an image to be written, which is recorded on the film 606, is enlarged to a size equivalent to the size of the picture area of the SLM 601 and is projected onto the SLM 601.

Figure 17B:
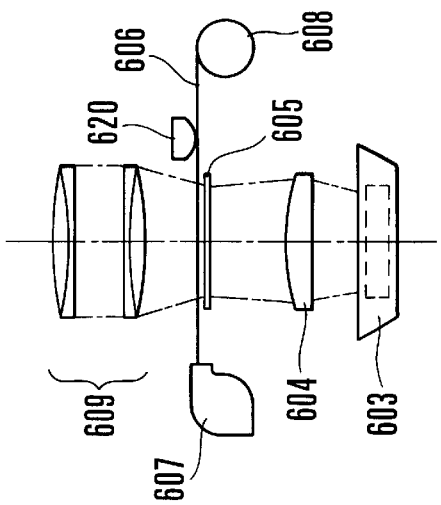

FIG. 17(b) is a view showing the arrangement of the constituent elements 603 to 609 as viewed in a direction perpendicular to the sheet surface of FIG. 17(a) (i.e., from the back side of the apparatus). The flash emission tube which serves as the writing light source 603 is disposed in parallel with the longitudinal direction of the image plane of the film 606, and the film 606 is fed out of a film cartridge 607 and wound around a spool 608.

An external-light sensor 611 uses a photoelectric conversion element such as a photodiode or a phototransistor, and is disposed below the screen of the SLM 601 to detect the amount of external light which illuminates the SLM 601 on the outside of the apparatus. An amount-of-writing-light sensor 612 includes a photoelectric conversion element such as a photodiode or a phototransistor, an element which integrates the output current of the photoelectric conversion element, and the like. The amount-of-writing-light sensor 612 is disposed at a position where a transmitted component of the writing light projected on the mirror 610 having a semi-transmission structure is made incident on the amount-of-writing-light sensor 612, and is arranged to detect the amount of writing light during writing. A lens before the amount-of-writing-light sensor 612 may be disposed as required. The reading light sources 602 and the amount-of-writing-light sensor 612 are disposed at positions which do not block a writing optical path.

Shutter means 618 for excluding a writing failure due to external light during image writing is disposed before the SLM 601. The shutter means 618 uses, for example, a liquid crystal panel, and is arranged to decrease its ray transmittance during writing of an image to the SLM 601 so as to block or reduce external light, and to increase the ray transmittance during image reading so as to make the image written to the SLM 601 visible. The shutter means 618 is preferably selected from among various light control elements whose light transmittance varies according to the mode of application of an electrical signal, for example, electrochromic elements or various liquid crystal devices such as twisted-nematic liquid crystal devices, guest-host liquid crystal devices and polymer dispersion type liquid crystal devices.

Photography information reading means 620 is disposed at a position close to the film 606. The photography information reading means 620 includes, for example, a magnetic head and a circuit for amplifying the output signal of the magnetic head, and is arranged to read photography information recorded on a magnetic recording portion of the film 606.

An operating switch 613 includes a display switch, a frame feed switch and the like as will be described later, and is disposed at a position which enables the user to easily operate the operating switch 613 while viewing the screen of the SLM 601.

A circuit block 614 is disposed in the bottom portion of the apparatus. As shown in FIG. 18, the circuit block 614 includes the above-described voltage applying means 616, film transporting means 617 for winding or rewinding the film 606 by driving the rotating shaft of the film cartridge 607 or the spool 608 by means of a motor or the like, shutter driving means 619 for driving the shutter means 618, and control means (control circuit) 615 using a microcomputer or the like. The control means 615 controls the voltage applying means 616, the film transporting means 617, the shutter means 618, the reading light sources 602 and the writing light source 603 in accordance with a predetermined program according to the outputs of the operating switch 613, the external-light sensor 611, the amount-of-writing-light sensor 612 and the photography information reading means 620.

A specific operation sequence of the control means 615 will be described below with reference to the flowcharts of FIGS. 19 and 20. First, reference will be made to FIG. 19 which shows a flowchart for controlling the entire operation of the apparatus.

If a power source switch (not shown) is turned on to make the control means 615 operable, the control means 615 initializes the required memory, output signals and the like in Step S001. In Step S001, the writing light source 603 and the reading light sources 602 are turned off, and the voltage applying means 616 does not provide any output.

In Step S002, the process waits for the film cartridge 607 to be loaded into the apparatus. If the film cartridge 607 is loaded, the process proceeds to Step S003. In Step S003, the control means 615 outputs a signal to the film transporting means 617 to cause it to start feeding the film 606 out of the film cartridge 607. Then, in Step S004, the control means 615 reads photography information corresponding to the photographic picture of the first frame of the film 606 through the photography information reading means 620. Then, in Step S005, the photographic picture of the first frame of the film 606 is set to a writing position, and the process proceeds to Step S006, in which the control means 615 stops outputting the signal to the film transporting means 617 to bring film feeding to an end.

Then, in Step S007, the process waits for the display switch included in the operating switch 613 to be turned on. If the display switch is turned on, the process proceeds to Step S008, in which the control means 615 executes a sequence for writing an image on the film 606 to the SLM 601. This image writing sequence will be described later.

After the image writing sequence has been executed in Step S008, the process proceeds to Step S009, in which the control means 615 reads the output of the external-light sensor 611 to obtain information indicative of the amount of external light. Then, in Step S010, the control means 615 turns on the reading light sources 602 to cause it to provide an optimum brightness, on the basis of the information indicative of the amount of external light. Thus, the image written to the SLM 601 becomes visible.

Then, in Step S011, the control means 615 checks whether the frame feed switch included in the operating switch 613 has been turned on. If the frame feed switch is off, the process proceeds to Step S012, in which the control means 615 checks whether the display switch included in the operating switch 613 has been turned on. If the display switch is continuously on from the time point of Step S007, the process returns to Step S011, and repeats Steps S011 and S012 for checking the states of the respective switches. If the display switch is off, the process proceeds to Step S013, in which the control means 615 turns off the reading light sources 602. Thus, the image written to the SLM 601 becomes invisible.

Then, in Step S014, the control means 615 outputs a control signal to the voltage applying means 616 so that a voltage of opposite polarity to the voltage applied during the image writing is applied to each electrode of the SLM 601. Thus, the image written to the SLM 601 is erased. Then, in Step S015, the control means 615 outputs a signal to the film transporting means 617 to cause it to start rewinding the film 606. In Step S016, the process waits until the film 606 is completely rewound into the film cartridge 607 and the film rewinding is completed. Then, the process proceeds to Step S017, in which the control means 615 stops outputting the signal to the film transporting means 617 and brings the film rewinding to an end.

On the other hand, if the control means 615 determines in Step S011 that the frame feed switch has been turned on, the process proceeds to Step S018, in which the control means 615 turns off the reading light sources 602. Thus, the image written to the SLM 601 becomes invisible. Then, the process proceeds to Step S019, in which the control means 615 outputs a signal to the film transporting means 617 to cause it to start winding the film 606. In Step S020, the control means 615 reads photography information corresponding to the photographic picture of the next frame of the film 606 through the photography information reading means 620, and in Step S021 the photographic picture of the next frame of the film 606 is set to the writing position. After the completion of setting, the process proceeds to Step S022, in which the control means 615 stops outputting the signal to the film transporting means 617 to bring the film winding to an end.

After the completion of Step S022, the process returns to Step S008, in which the control means 615 again executes the image writing sequence, and turns on the reading light sources 602 in Step S010. Thus, the images of the second and following frames become visible.

The image writing sequence executed in Step S008 will be described below with reference to the flowchart of FIG. 20.

In Step S101, the control means 615 sends a signal to the shutter driving means 619 to bring the shutter means 618 into a light blocking state. Thus, it is possible to prevent the user from being dazzled by writing light passing through the SLM 601 outwardly during a later light emission from the writing light source 603.

Then, in Step S102, an image erasing operation is performed because an image may occasionally be already written to the SLM 601. Specifically, the control means 615 outputs a control signal to the voltage applying means 616 so that a voltage of opposite polarity to the voltage applied during the image writing is applied to each electrode of the SLM 601.

Then, in Step S103, the control means 615 identifies the photography information read in Step S004 or S020 and obtains information required for image writing. The information required for image writing includes information relative to the exposure of a camera during photography, information relative to the luminance of a subject and the state of light (front light or rear light), the amount of light of a flash emission, and the like.

Then, in Step S104, the control means 615 determines a time period (target time period of light emission or target time period of incidence) for which the writing light source 603 needs to be made to emit light during writing of the image to the SLM 601, on the basis of such photography information. The time period of such light emission is determined so as to prevent the amount of writing light from becoming insufficient, by making the time period of light emission longer as the density of an image on the film 606 is higher, in accordance with the obtained photography information on the basis of the characteristics described previously with reference to FIG. 3.

Then, in Step S105, the control means 615 outputs a control signal to the voltage applying means 616 to cause it to apply a predetermined voltage to the electrodes of the SLM 601. Then, in Step S106, the control means 615 turns on the writing light source 603 to cause it to start projecting the image from the film 606 onto the SLM 601.

Then, in Step S107, the process waits until the time period of light emission determined in Step S104 elapses and the amount of light optimum for image writing is projected on the SLM 601. When the time period of light emission elapses, the process proceeds to Step S108, in which the control means 615 turns off the writing light source 603. Then, in Step S109, the control means 615 stops outputting the control signal to the voltage applying means 616, and stops the application of the writing voltage to the electrodes of the SLM 601. Then, the process proceeds to Step S110, in which the control means 615 sends a signal to the shutter driving means 619 to bring the shutter means 618 into a light transmitting state. In this state, if the reading light source 602 is turned on, the written image becomes visible.

In the above-described image writing sequence, since the control means 615 determines an optimum time period of incidence of writing light on the SLM 601 according to the photography information, it is possible to effect optimum image writing to the SLM 601 irrespective of the density of film images.

Incidentally, although the above-described eighth embodiment is arranged to turn off the writing light source 603 in a determined time period during image writing, it is possible to adopt another arrangement in which, for example, a shutter is disposed in the vicinity of the writing light source 603 and the control means 615 is arranged to close the shutter in a determined time period to bring the incidence of writing light on the SLM 601 to an end.

(Ninth Embodiment)

Although the above-described eighth embodiment is arranged to determine an optimum time period of incidence of writing light on the SLM 601 according to photography information and carry out image writing based on the time period, a ninth embodiment is arranged to determine an optimum amount of writing light according to photography information and carry out image writing based on the amount of writing light.

Figure 19:
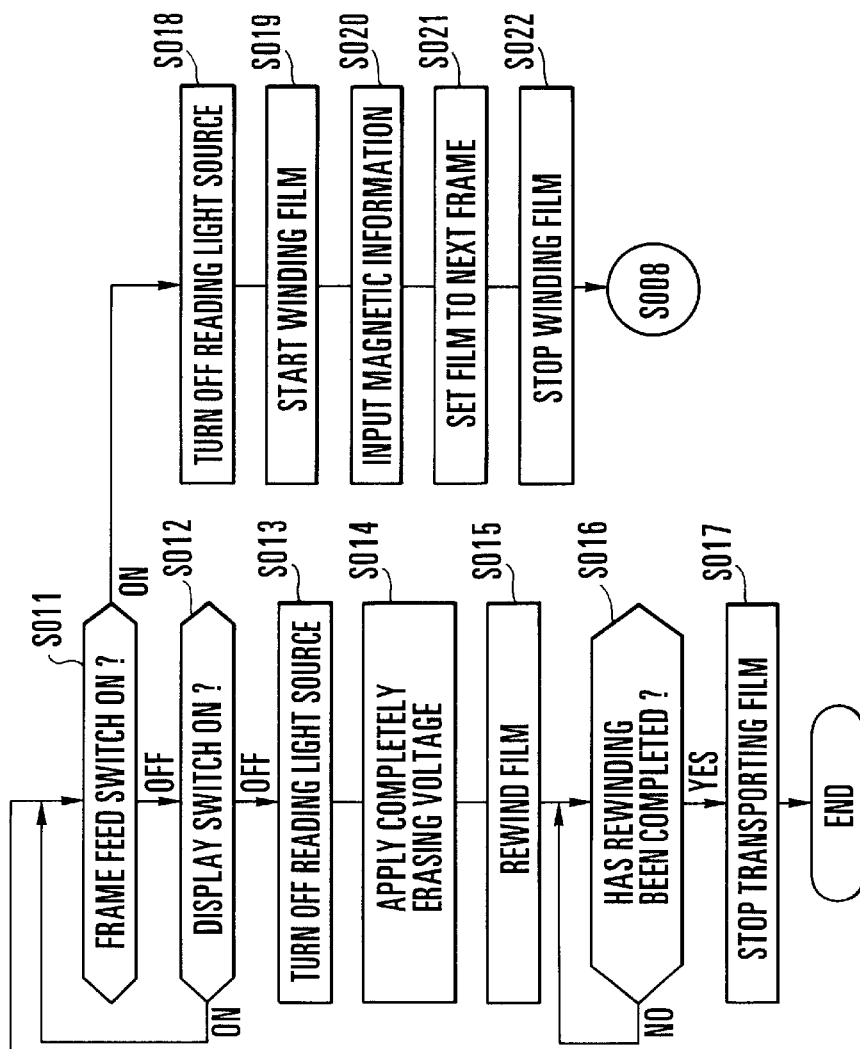
FIG. 19 is a flowchart showing the operation sequence of the image display apparatus according to the eighth embodiment of the present invention.
Figure 20:
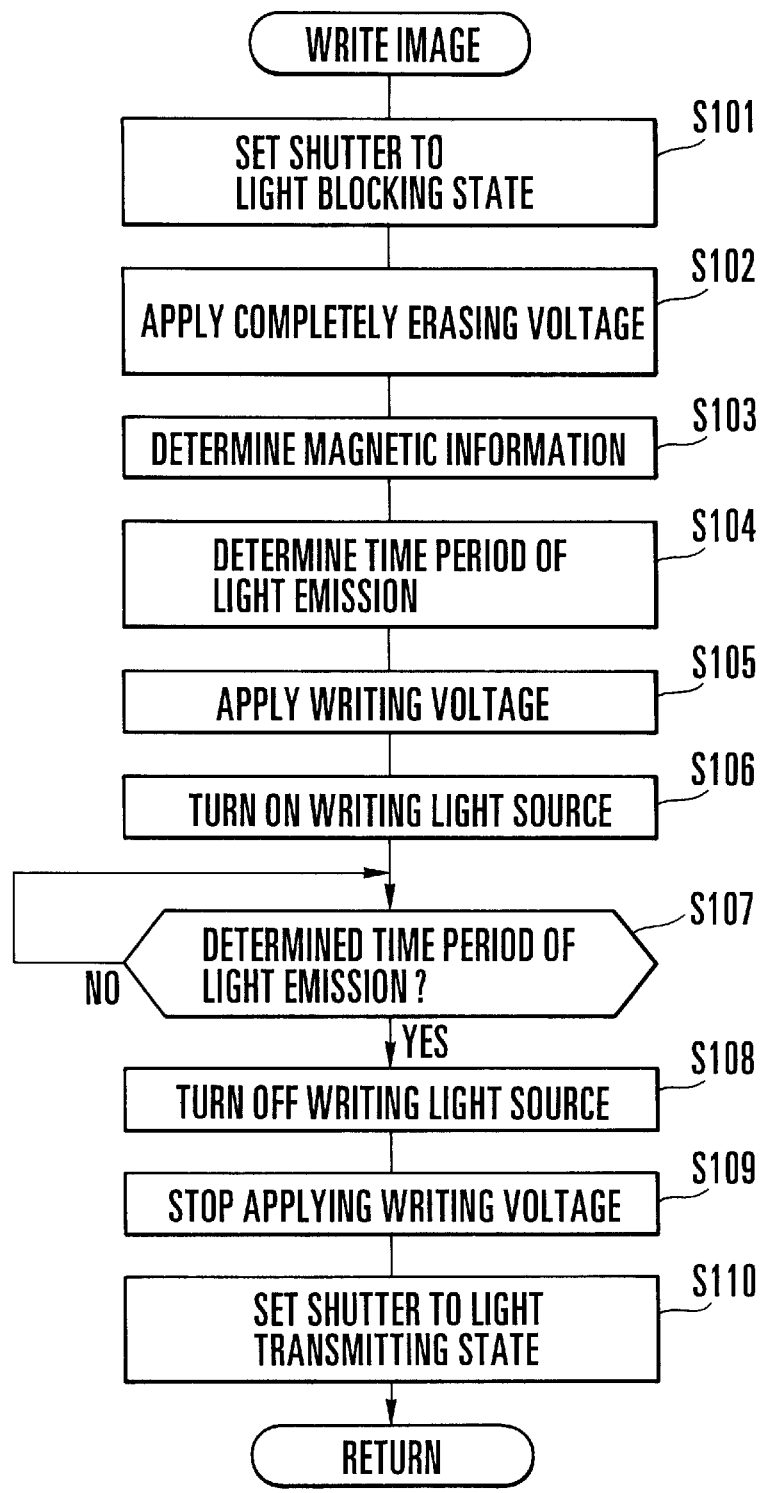
FIG. 20 is a flowchart showing the operation sequence of the image display apparatus according to the eighth embodiment of the present invention.
Figure 21:
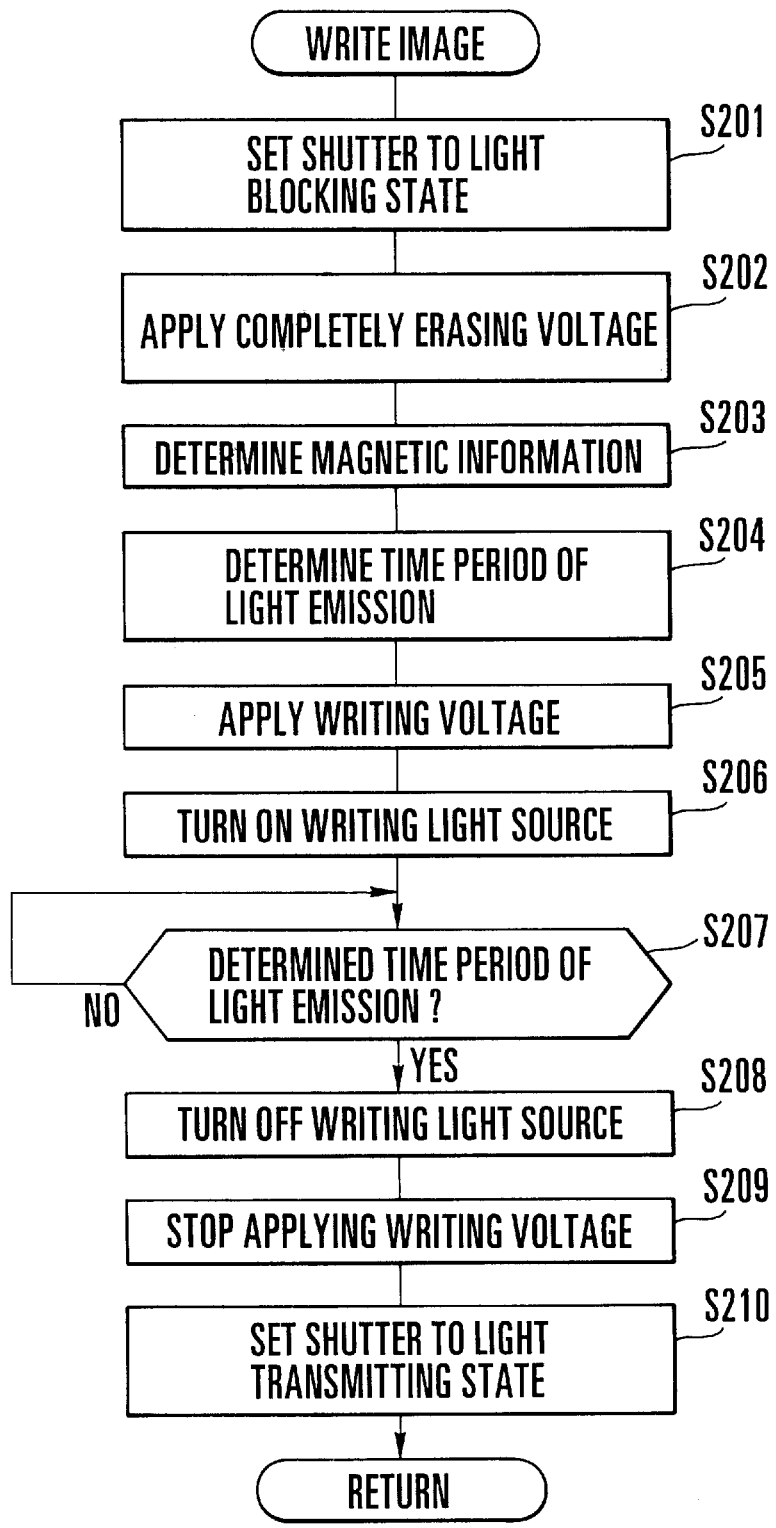
FIG. 21 is a flowchart showing the operation sequence of an image display apparatus according to a ninth embodiment of the present invention.

Incidentally, the ninth embodiment can be carried out with an apparatus having an arrangement identical to the image display apparatus described above in connection with the eighth embodiment, and the entire operation sequence of the control means 615 may be that shown in FIG. 19. However, the image writing sequence executed in Step S008 of FIG. 19 uses the sequence shown in FIG. 21. The following description will refer to the image writing sequence shown in FIG. 21.

In Step S201, the control means 615 sends a signal to the shutter driving means 619 to bring the shutter means 618 into a light blocking state. Then, in Step S202, an image erasing operation is performed because an image may occasionally be already written to the SLM 601. Specifically, the control means 615 outputs a control signal to the voltage applying means 616 so that a voltage of opposite polarity to the voltage applied during image writing is applied to each electrode of the SLM 601.

Then, in Step S203, the control means 615 identifies the photography information read in Step S004 or S020 and obtains information required for image writing. The information required for image writing includes information relative to the exposure of a camera during photography, information relative to the luminance of a subject and the state of light (front light or rear light), the amount of light of a flash emission, and the like.

Then, in Step S204, the control means 615 determines the amount of writing light (the target amount of incident light) to be projected on the SLM 601 during writing of the image to the SLM 601, on the basis of such photography information. The amount of writing light is determined so as to prevent the amount of writing light from becoming insufficient, by making the amount of incident light larger as the density of an image on the film 606 is higher, in accordance with the obtained photography information on the basis of the characteristics described previously with reference to FIG. 3.

Then, in Step S205, the control means 615 outputs a control signal to the voltage applying means 616 to cause it to apply a predetermined voltage to the electrodes of the SLM 601. Then, in Step S206, the control means 615 turns on the writing light source 603 to cause it to start projecting the image from the film 606 onto the SLM 601.

Then, in Step S207, the control means 615 monitors the output of the amount-of-writing-light sensor 612, and the process waits until the amount of writing light optimum for image writing, determined in Step S204, is projected on the SLM 601.

When the amount of writing light determined in Step S204 is projected on the SLM 601 in this manner, the process proceeds to Step S208, in which the control means 615 turns off the writing light source 603. Then, in Step S209, the control means 615 stops outputting the control signal to the voltage applying means 616, and stops the application of the writing voltage to the electrodes of the SLM 601.

Then, the process proceeds to Step S210, in which the control means 615 sends a signal to the shutter driving means 619 to bring shutter means 618 into a light transmitting state. In this state, if the reading light source 602 is turned on, the written image becomes visible.

In the above-described image writing sequence, since the control means 615 determines the optimum amount of incidence of writing light on the SLM 601 according to the photography information, it is possible to effect optimum image writing to the SLM 601 irrespective of the density of film images.

(Tenth Embodiment)

Although either of the above-described eighth and ninth embodiment is arranged to determine an optimum amount (time period) of incidence of writing light on the SLM 601 according to photography information and carry out image writing based on the optimum amount (time period) of incidence, a tenth embodiment is arranged to determine an optimum voltage to be applied to the SLM 601 according to photography information and carry out image writing based on the optimum voltage.

Figure 22:
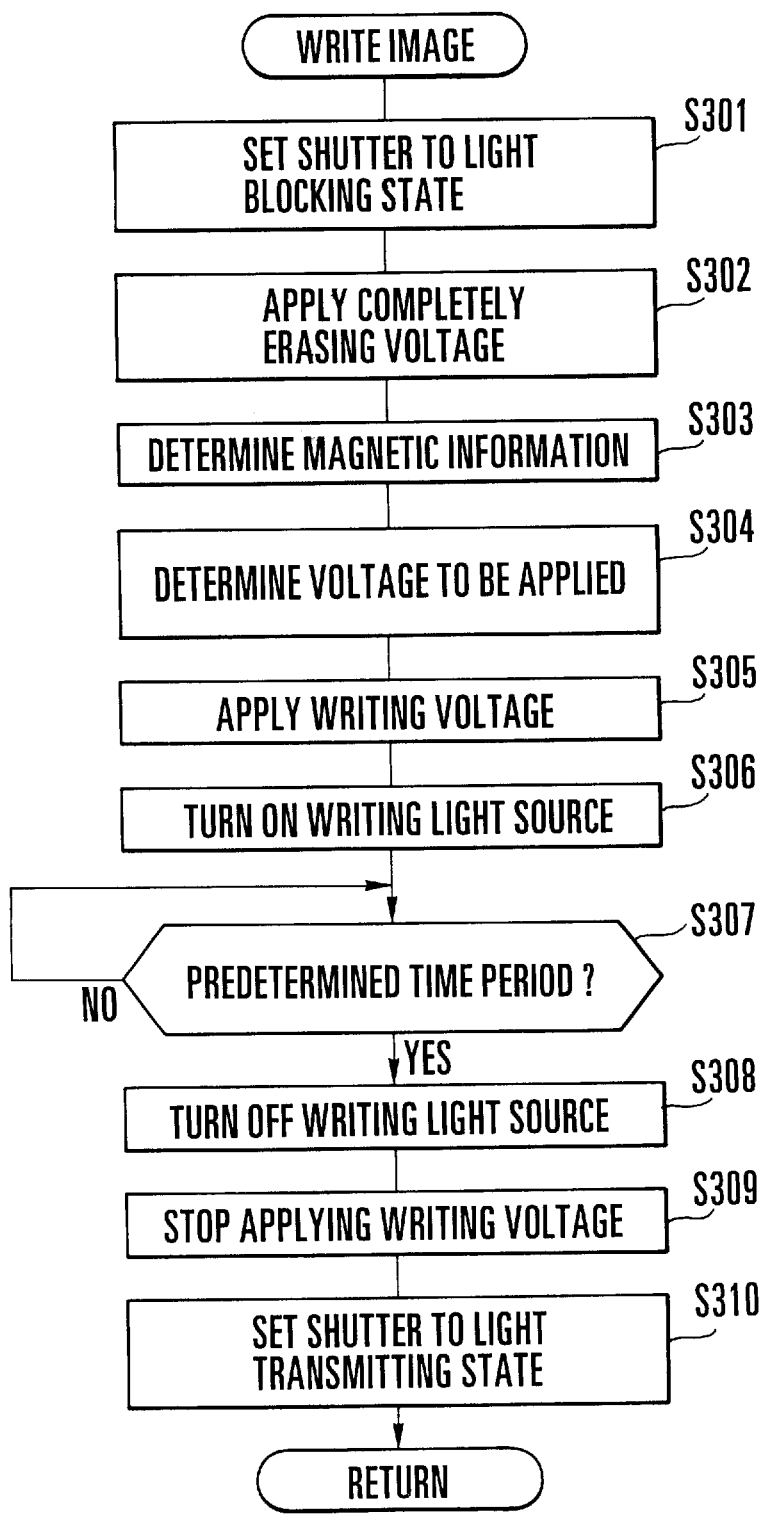
FIG. 22 is a flowchart showing the operation sequence of an image display apparatus according to a tenth embodiment of the present invention.

Incidentally, the tenth embodiment can be carried out with an apparatus having an arrangement identical to the image display apparatus described above in connection with the eighth embodiment, and the entire operation sequence of the control means 615 may be that shown in FIG. 19. However, the image writing sequence executed in Step S008 of FIG. 19 uses the sequence shown in FIG. 22. The following description will refer to the image writing sequence shown in FIG. 22.

In Step S301, the control means 615 sends a signal to the shutter driving means 619 to bring the shutter means 618 into a light blocking state. Then, in Step S302, an image erasing operation is performed because an image may occasionally be already written to the SLM 601. Specifically, the control means 615 outputs a control signal to the voltage applying means 616 so that a voltage of opposite polarity to the voltage applied during image writing is applied to each electrode of the SLM 601.

Then, in Step S303, the control means 615 identifies the photography information read in Step S004 or S020 and obtains information required for image writing. The information required for image writing includes information relative to the exposure of a camera during photography, information relative to the luminance of a subject and the state of light (front light or rear light), the amount of light of a flash emission, and the like.

Then, in Step S304, the control means 615 determines the value of a voltage to be applied to the SLM 601 during image writing (an image storage operation condition), on the basis of the photography information. The value of such voltage is determined so as to prevent a written image from being biased to a brighter side, by making the value of the voltage larger as the density of an image on the film 606 is higher (as the amount of writing light more easily runs short), in accordance with the obtained photography information on the basis of the characteristics described previously with reference to FIG. 3.

Then, in Step S305, the control means 615 outputs a control signal to the voltage applying means 616 to cause it to apply the voltage determined in Step S304 to the electrodes of the SLM 601. Then, in Step S306, the control means 615 turns on the writing light source 603 to cause it to start projecting the image from the film 606 onto the SLM 601.

Then, in Step S307, the process waits until a predetermined time period elapses and the amount of writing light optimum for image writing is projected on the SLM 601.

When the optimum amount of writing light is projected on the SLM 601 in this manner, the process proceeds to Step S308, in which the control means 615 turns off the writing light source 603. Then, in Step S309, the control means 615 stops outputting the control signal to the voltage applying means 616, and stops the application of the writing voltage to the electrodes of the SLM 601.

Then, the process proceeds to Step S310, in which the control means 615 sends a signal to the shutter driving means 619 to bring the shutter means 618 into a light transmitting state. In this state, if the reading light source 602 is turned on, the written image becomes visible.

In the above-described image writing sequence, since the control means 615 determines the optimum voltage to be applied to the SLM 601 according to the photography information, it is possible to effect optimum image writing to the SLM 601 irrespective of the density of film images.

(Eleventh Embodiment)

Although any of the above-described eighth to tenth embodiments is arranged to control the writing of an image to the SLM 601 according to read photography information, an eleventh embodiment is arranged to control the reading light source 602 according to read photography information.

Figure 23:
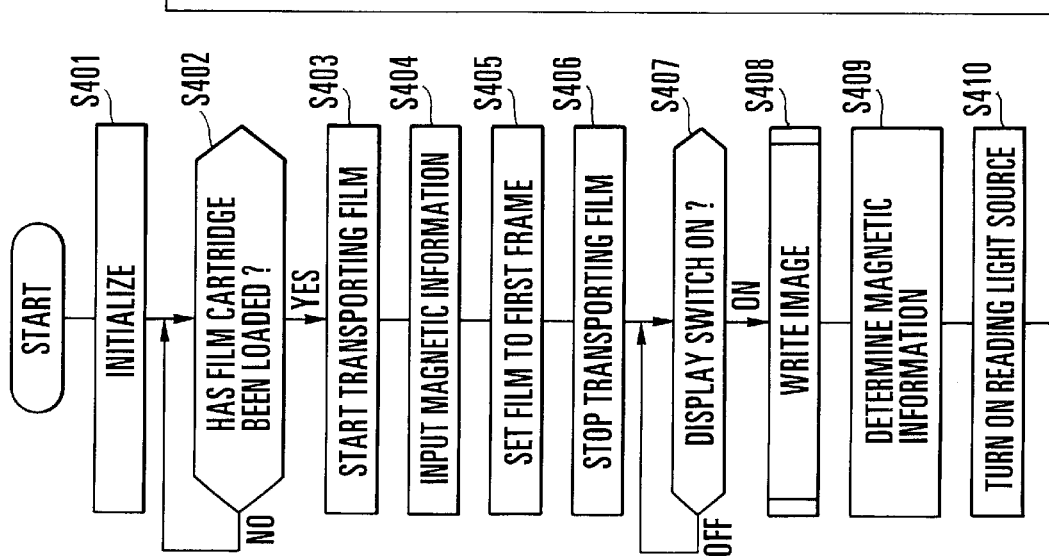
FIG. 23 is a flowchart showing the operation sequence of an image display apparatus according to an eleventh embodiment of the present invention.

Incidentally, the eleventh embodiment can be carried out with an apparatus having an arrangement identical to the image display apparatus described above in connection with the eighth embodiment, and an image reading sequence may be that described previously in connection with each of the eighth to tenth embodiments. However, the entire operation sequence of the control means 615 uses the sequence shown in FIG. 23. The following description will refer to the entire operation sequence shown in FIG. 23.

If a power source switch (not shown) is turned on to make the control means 615 operable, the control means 615 initializes the required memory, output signals and the like in Step S401. In Step S401, the writing light source 603 and the reading light sources 602 are turned off, and the voltage applying means 616 does not provide any output.

In Step S402, the process waits for the film cartridge 607 to be loaded into the apparatus. If the film cartridge 607 is loaded, the process proceeds to Step S403. In Step S403, the control means 615 outputs a signal to the film transporting means 617 to cause it to start feeding the film 606 out of the film cartridge 607. Then, in Step S404, the control means 615 reads photography information corresponding to the photographic picture of the first frame of the film 606 through the photography information reading means 620. Then, in Step S405, the photographic picture of the first frame of the film 606 is set to a writing position, and the process proceeds to Step S406, in which the control means 615 stops outputting the signal to the film transporting means 617 to bring film feeding to an end.

Then, in Step S407, the process waits for the display switch included in the operating switch 613 to be turned on. If the display switch is turned on, the process proceeds to Step S408, in which the control means 615 executes a sequence for writing an image on the film 606 to the SLM 601.

After the image writing sequence has been executed in Step S408, the process proceeds to Step S409, in which the control means 615 identifies the photography information read in Step S404 and obtains information required for controlling reading light. The information required for controlling reading light includes information relative to the exposure of a camera during photography, information relative to the luminance of a subject and the state of light (front light or rear light), the amount of light of a flash emission, and the like.

Then, in Step S410, the control means 615 performs lighting control on the reading light sources 602 to cause it to provide an optimum brightness, on the basis of the photography information. The lighting control is performed in such a manner as to make the amount of light of the reading light source 602 smaller as the density of an image on the film 606 is higher (as an image to be written is brighter), in accordance with the obtained photography information on the basis of the characteristics described previously with reference to FIG. 3. Thus, it is possible to obtain a read image of far higher image quality irrespective of the density of film images.

Then, in Step S411, the control means 615 checks whether the frame feed switch included in the operating switch 613 has been turned on. If the frame feed switch is off, the process proceeds to Step S412, in which the control means 615 checks whether the display switch included in the operating switch 613 has been turned on. If the display switch is continuously on from the time point of Step S407, the process returns to Step S411, and repeats Steps S411 and S412 for checking the states of the respective switches. If the display switch is off, the process proceeds to Step S413, in which the control means 615 turns off the reading light sources 602. Thus, the image written to the SLM 601 becomes invisible.

Then, in Step S414, the control means 615 outputs a control signal to the voltage applying means 616 so that a voltage of opposite polarity to the voltage applied during the image writing is applied to each electrode of the SLM 601. Thus, the image written to the SLM 601 is erased. Then, in Step S415, the control means 615 outputs a signal to the film transporting means 617 to cause it to start rewinding the film 606. In Step S416, the process waits until the film 606 is completely rewound into the film cartridge 607 and the film rewinding is completed. Then, the process proceeds to Step S417, in which the control means 615 stops outputting the signal to the film transporting means 617 and brings the film rewinding to an end.

On the other hand, if the control means 615 determines in Step S411 that the frame feed switch has been turned on, the process proceeds to Step S418, in which the control means 615 turns off the reading light sources 602. Thus, the image written to the SLM 601 becomes invisible. Then, the process proceeds to Step S419, in which the control means 615 outputs a signal to the film transporting means 617 to cause it to start winding the film 606. In Step S420, the control means 615 reads photography information corresponding to the photographic picture of the next frame of the film 606 through the photography information reading means 620, and in Step S421 the photographic picture of the next frame of the film 606 is set to the writing position. After the completion of setting, the process proceeds to Step S422, in which the control means 615 stops outputting the signal to the film transporting means 617 to bring the film winding to an end.

After the completion of Step S422, the process returns to Step S408, in which the control means 615 again executes the image writing sequence, and controls the lighting of the reading light sources 602 in Step S410. Thus, the images of the second and following frames become visible.

Incidentally, if the photography information recorded on the film 606 includes other kinds of information such as the kind of light source used during photography and the color of the light source, it is possible to optimize the color of a read image by controlling the spectral characteristics of reading light on the basis of such information. As means for controlling the spectral characteristics of reading light, filters having different spectral transmittances may be switchably disposed between the reading light source 602 and the SLM 601, or a plurality of light sources having different spectral characteristics may be prepared so that the mixture ratio of the lights of the respective light sources in reading light can be changed.

Although in each of the descriptions of the eighth to eleventh embodiments reference has been made to an image display apparatus which uses a liquid crystal type of spatial light modulator as storage display means, the present invention can also be applied to an image display apparatus which uses a spatial light modulator of a type other than the liquid crystal type, for example, a spatial light modulator using an ECD (electrochromic display), or another type of storage display means.

As is apparent from the foregoing description, in accordance with each of the eighth to eleventh embodiments, since the writing of an image to the storage display means is controlled according to photography information recorded on a film by magnetism or the like, an image which conforms with the range of reproduction of the tone of an image to be read can always be written to the storage display means, irrespective of the density of the film image determined by various conditions during photography, whereby the user can view an image of high image quality.

In addition, since the amount of reading light which illuminates the storage display means is controlled according to photography information, the user can view an image of high image quality irrespective of the density of film images or the difference between the colors of light sources during photography.

Incidentally, if light blocking means for blocking the incidence of external light on the storage display means during an image storage operation of the storage display means is provided, it is possible to eliminate the influence of external light on image writing and allow the user to view an image of far higher image quality. In addition, it is possible to prevent the user from being dazzled by writing light passing through the storage display means outwardly during the image writing.

What is claimed is:

1. An image display apparatus having a storage/display element for receiving writing light indicative of an image obtained from an original, storing the image by receiving said writing light, and, after the image storage being performed, displaying the stored image by receiving reading light, comprising:
    a light detecting mechanism for detecting light which has an influence on writing; and
    a determining circuit for determining an image storage operation condition for said storage/display element according to an amount of light detected by said light detecting mechanism,
    wherein the image is stored according to the image storage operation condition determined by said determining circuit.

2. An apparatus according to claim 1, wherein said light detecting mechanism detects an amount of the writing light projected on said storage/display element.

3. An apparatus according to claim 2, wherein said determining circuit causes said storage/display element to continue a storage operation until the amount of the writing light detected by said light detecting mechanism reaches a predetermined amount of light.

4. An apparatus according to claim 1, wherein said light detecting mechanism detects an amount of external light of said image display apparatus.

5. An apparatus according to claim 4, wherein said determining circuit determines a target amount of the writing light according to the amount of external light detected by said light detecting mechanism.

6. An apparatus according to claim 4, wherein said determining circuit determines a voltage to be applied during writing to said storage/display element, according to the amount of the external light detected by said light detecting mechanism.

7. An apparatus according to claim 1, wherein said determining circuit determines a target amount of the writing light according to the amount of light detected by said light detecting mechanism.

8. An apparatus according to claim 1, wherein said determining circuit determines a voltage to be applied during writing to said storage/display element, according to the amount of light detected by said light detecting mechanism.

9. An apparatus according to claim 1, wherein said light detecting mechanism detects an amount of the writing light projected on said storage/display element and an amount of external light of said image display apparatus.

10. An apparatus according to claim 9, wherein said determining circuit determines a target amount of the writing light according to the amount of external light detected by said light detecting mechanism, and causes said storage/display element to continue a storage operation until the amount of the writing light detected by said light detecting mechanism reaches a predetermined amount of light.

11. An apparatus according to claim 1, further comprising a writing illumination element for producing the writing light and a reading illumination element for reading of a display.

12. An apparatus according to claim 2, further comprising a writing illumination element for producing the writing light and a reading illumination element for reading of a display.

13. An apparatus according to claim 4, further comprising a writing illumination element for producing the writing light and a reading illumination element for reading of a display.

14. An apparatus according to claim 12, wherein said determining circuit causes said writing illumination element to perform a preliminary light emission, determines a target amount of light according to the amount of the writing light detected by said light detecting mechanism during the preliminary light emission, and causes said storage/display element to perform a storage operation until the amount of the writing light detected by said light detecting mechanism during a main light emission reaches the target amount of light.

15. An apparatus according to claim 12, wherein said determining circuit causes said writing illumination element to perform a preliminary light emission, determines a target incidence time period according to the amount of the writing light detected by said light detecting mechanism during the preliminary light emission, and causes said storage/display element to perform a storage operation until the amount of the writing light detected by said light detecting mechanism during a main light emission reaches the target incidence time period.

16. An apparatus according to claim 11, wherein said determining circuit causes said writing illumination element to perform a preliminary light emission, and determines an image storage operation condition for said storage/display element according to the amount of the writing light detected by said light detecting mechanism during the preliminary light emission.

17. An apparatus according to claim 11, wherein said light detecting mechanism detects an amount of light reflected by said storage/display element from the writing light projected on said storage/display element.

18. An apparatus according to claim 11, wherein said light detecting mechanism detects an amount of divided light provided by a light dividing element disposed in an optical path, from the writing light projected on said storage/display element.

19. An apparatus according to claim 16, wherein part of said light detecting mechanism is positioned in an optical path during the preliminary light emission, and is retracted from the optical path during a main light emission.

20. An apparatus according to claim 1, further comprising a light blocking mechanism for blocking incidence of external light on said storage/display element during an image storage operation of said storage/display element.

21. An apparatus according to claim 2, further comprising a light blocking mechanism for blocking incidence of external light on said storage/display element during an image storage operation of said storage/display element and during detection of the amount of the writing light projected on said storage/display element, by said light detecting mechanism.

22. An apparatus according to claim 20, wherein said light blocking mechanism uses a light blocking element whose transmittance varies according to a condition of application of an electrical signal.

23. An apparatus according to claim 21, wherein said light blocking mechanism uses a light blocking element whose transmittance varies according to a condition of application of an electrical signal.

24. An apparatus according to claim 1, wherein said storage/display element is a spatial light modulator.

25. An apparatus according to claim 2, wherein said storage/display element is a spatial light modulator.

26. An apparatus according to claim 4, wherein said storage/display element is a spatial light modulator.

27. An apparatus according to claim 2, wherein the original is a developed film.

28. An apparatus according to claim 4, wherein the original is a developed film.

29. An image display apparatus having a storage/display element for receiving a writing light indicative of an image obtained from a developed film, said element storing the image by receiving the writing light and displaying the stored image by receiving reading light after the image storage, comprising:

an information reading mechanism for reading photography information from the developed film; and a determining circuit for determining an image storage operation condition for said storage/display element according to the photography information detected by said information reading mechanism, wherein the storage of the image is performed according to the image storage operation condition determined by said determining circuit.

30. An apparatus according to claim 29, wherein said determining circuit determines a target amount of the writing light according to the photography information detected by said information reading mechanism.

31. An apparatus according to claim 29, further comprising a light detecting mechanism for detecting light which has an influence on writing, said determining circuit determining a target amount of the writing light according to the photography information detected by said information reading mechanism and causing said storage/display element to continue a storage operation until the amount of the writing light detected by said light detecting mechanism reaches a predetermined amount of light.

32. An apparatus according to claim 29, wherein said determining circuit determines a voltage to be applied to said storage/display element during writing, according to the photography information detected by said information reading mechanism.

33. An apparatus according to claim 29, further comprising a light blocking mechanism for blocking incidence of external light on said storage/display element during an image storage operation of said storage/display element.

34. An apparatus according to claim 31, further comprising a light blocking mechanism for blocking incidence of external light on said storage/display element during an image storage operation of said storage/display element and during detection of the amount of the writing light projected on said storage/display element, by said light detecting mechanism.

35. An apparatus according to claim 33, wherein said light blocking mechanism uses a light blocking element whose transmittance varies according to a condition of application of an electrical signal.

36. An apparatus according to claim 34, wherein said light blocking mechanism uses a light blocking element whose transmittance varies according to a condition of application of an electrical signal.

37. An apparatus according to claim 29, wherein said storage/display element is a spatial light modulator.

38. An apparatus according to claim 31, wherein said storage/display element is a spatial light modulator.

39. An apparatus according to claim 34, wherein said storage/display element is a spatial light modulator.

40. An apparatus according to claim 37, wherein said spatial light modulator includes at least a photoconductor layer and a liquid crystal layer which are sandwiched between transparent electrodes.

41. An apparatus according to claim 38, wherein said spatial light modulator includes at least a photoconductor layer and a liquid crystal layer which are sandwiched between transparent electrodes.

42. An apparatus according to claim 39, wherein said spatial light modulator includes at least a photoconductor layer and a liquid crystal layer which are sandwiched between transparent electrodes.

* * * * *

UNITED STATES PATENT AND TRADEMARK OFFICE
CERTIFICATE OF CORRECTION

PATENT NO. : 6,222,509 B1
DATED : April 24, 2001
INVENTOR(S) : Toshifumi Ohsawa et al.

It is certified that error appears in the above-identified patent and that said Letters Patent is hereby corrected as shown below:

Column 3,
Lines 32 and 36, delete "layer If" and insert -- layer 1f --.
Line 37, delete "glass id" and insert -- glass 1d --
Line 66, delete "AS" and insert -- As --.

Column 4,
Line 7, delete "layer if" and insert -- layer 1f --.

Column 9,
Line 24, delete "SLIM 1" and insert -- SLM 1 --.

Column 12,
Lines 15, 29 and 41, delete "SLIM 1" and insert -- SLM 1 --.

Signed and Sealed this

Thirtieth Day of April, 2002

Attest:

Attesting Officer

JAMES E. ROGAN
Director of the United States Patent and Trademark Office